US011156450B2

(12) United States Patent
Lu et al.

(10) Patent No.: US 11,156,450 B2
(45) Date of Patent: Oct. 26, 2021

(54) METHOD, DEVICE AND ELECTRONIC APPARATUS FOR ESTIMATING PHYSICAL PARAMETER BY DISCRETE CHIRP FOURIER TRANSFORM

(71) Applicant: BEIJING INSTITUTE OF TECHNOLOGY, Beijing (CN)

(72) Inventors: Mingfeng Lu, Beijing (CN); Jinmin Wu, Beijing (CN); Kun Xiong, Beijing (CN); Xianggen Xia, Beijing (CN); Feng Zhang, Beijing (CN); Ran Tao, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 16/941,972

(22) Filed: Jul. 29, 2020

(65) Prior Publication Data
US 2020/0355487 A1    Nov. 12, 2020

(30) Foreign Application Priority Data

Mar. 28, 2019    (CN) .......................... 201910243920.9

(51) Int. Cl.
*G01B 9/02*    (2006.01)
*G01B 11/255*    (2006.01)

(52) U.S. Cl.
CPC ..... *G01B 9/02084* (2013.01); *G01B 9/02041* (2013.01); *G01B 11/255* (2013.01)

(58) Field of Classification Search
CPC ........... G01B 9/02041; G01B 9/02084; G01B 11/162; G01B 11/255; G01M 11/0271; G01M 11/30
(Continued)

(56) References Cited

U.S. PATENT DOCUMENTS 5,463,707 A * 10/1995 Nakata ................. G02B 6/4204
385/33
7,161,686 B2    1/2007 Duling et al.
(Continued)

FOREIGN PATENT DOCUMENTS

CN    104931982    9/2015
CN    106092158    11/2016
(Continued)

OTHER PUBLICATIONS

Gorthi, Sai Siva et al. "Estimation of phase derivatives using discrete chirp-Fourier-transform-based method". Optics Letters, vol. 34, No. 16, Aug. 15, 2009, pp. 2396-2398. (Year: 2009).*
(Continued)

*Primary Examiner* — Michael A Lyons
(74) *Attorney, Agent, or Firm* — Wenderoth, Lind & Ponack, L.L.P.

(57) ABSTRACT

A method, device and electronic apparatus for estimating physical parameters are disclosed. The method includes: reading a Newton's rings fringe pattern obtained by performing an interferometric measurement on a unit to be measured; obtaining the number and length of first-direction signals of the Newton's rings fringe pattern; performing, for each of the first-direction signals, a discrete chirp Fourier transform (DCFT) on the first-direction signal based on each first chirp rate parameter within a range of the length of first-direction signals, to obtain a first magnitude spectrum of an intensity distribution signal in a DCFT domain; determining a first chirp rate parameter and a first frequency parameter corresponding to a first magnitude peak value based on the first magnitude spectrum; and estimating the physical parameters involved in the interferometric measurement at least according to the first chirp rate parameter and first frequency parameter corresponding to the first magnitude peak value. In this way, the physical parameters (Continued)

involved in the interferometric measurement can be estimated with high accuracy and stably.

20 Claims, 9 Drawing Sheets

(58) Field of Classification Search
USPC ........................................................ 356/73.1
See application file for complete search history.

(56) References Cited

U.S. PATENT DOCUMENTS

| 10,429,169 | B2 | 10/2019 | Lu et al. | |
|---|---|---|---|---|
| 2013/0063720 | A1* | 3/2013 | Flora | G01N 21/01 356/244 |

FOREIGN PATENT DOCUMENTS

| CN | 106094478 | 11/2016 |
|---|---|---|
| CN | 106101034 | 11/2016 |
| CN | 106199791 | 12/2016 |
| CN | 106595529 | 4/2017 |
| CN | 107171693 | 9/2017 |
| CN | 107450055 | 12/2017 |
| CN | 107703626 | 2/2018 |
| JP | 5742194 | 7/2015 |

OTHER PUBLICATIONS

Lu, Ming-Feng et al. "Parameter estimation of optical fringes with quadratic phase using the fractional Fourier transform". Optics and Lasers in Engineering, 74, 2015, pp. 1-16. (Year: 2016).*

Wu, Jin Min et al. "Improved FRFT-based method for estimating the physical parameters from Newton's rings". Optics and Lasers in Engineering, 91, 2017, pp. 178-186. (Year: 2017).*

Ma, Jinming et al., "Research Progress in Theories and Applications of the Fractional Fourier Transform", Opto-Electronic Engineering, 2018, vol. 45, No. 6, pp. 170747-1 to 170747-24.

Lu, Mingfeng et al., "Chirp Images in 2-D Fractional Fourier Transform Domain," IEEE International Conference on Signal Processing, Communications and Computing (ICSPCC), Aug. 5, 2016, 4 pages.

Lu, Mingfeng et al., "A Novel Method for Suppressing the Quantization Noise Based on Fractional Fourier Transform", Transactions of Beijing Institute of Technology, 2015, vol. 35, No. 12, pp. 1285-1290.

* cited by examiner

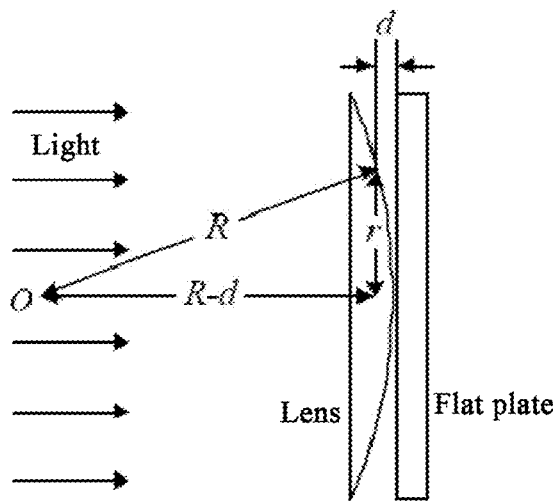
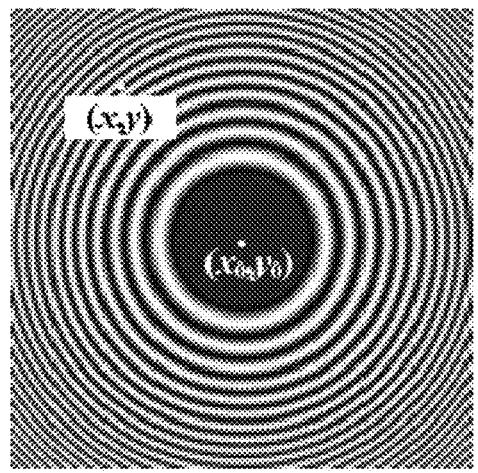
FIG. 2A
FIG. 2B
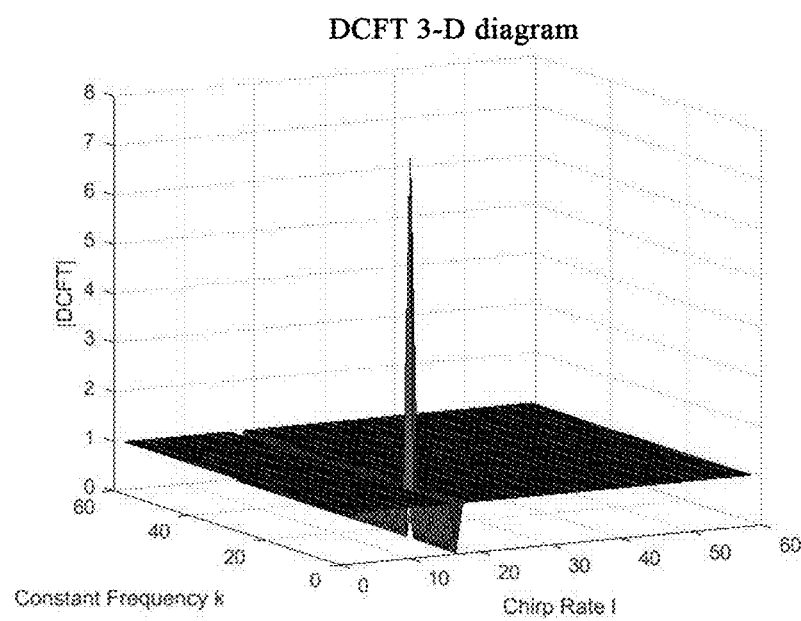
FIG. 3

METHOD, DEVICE AND ELECTRONIC APPARATUS FOR ESTIMATING PHYSICAL PARAMETER BY DISCRETE CHIRP FOURIER TRANSFORM

FIELD OF THE INVENTION

The present disclosure relates to the technical field of interferometric measurement, and more particularly, to a method, device and electronic apparatus for estimating physical parameters, and a computer program product and a computer-readable storage medium thereof.

BACKGROUND OF THE INVENTION

An accurate measurement of physical parameters of a device (for example, optical parameters of an optical device) is crucial in a procedure of device measurement and fabrication. Contact measuring methods may require polishing processing on a surface of a unit to be measured, which causes abrasion to the unit, thus non-contact measuring methods are usually adopted at present.

An interferometric measurement plays an important role in the non-contact measuring methods, and a key point thereof is to analyze and process an interference fringe pattern (for example, a Newton's rings fringe pattern) generated by performing the interferometric measurement on the unit to be measured, so as to obtain various physical parameters, such as curvature radius, vertex position, wavelength of incident light, refractive index of media, deformation and displacement, of the unit to be measured.

A simplified method for processing the Newton's rings fringe pattern (a basic interference fringe pattern) is a ring-counting calculating method, which measures the interference fringe pattern by using a reading microscope, obtains diameter values of two orders of dark fringes, and calculates the physical parameters, such as the curvature radius, of the unit to be measured on the basis of the diameter values and wavelength of light. Generally speaking, for the sake of measurement accuracy, a diameter of the 40th-order ring beginning from the 0-order center-ring, needs to be measured. The above-described ring-counting calculating method is simple to implement and has a low cost. However, it is easy for an observer to make mistakes due to visual fatigue when counting the rings, and the automation degree is low for this method. Further, since a field range of the reading microscope is relatively small, it is not possible for the observer to see the entire interference fringe pattern, i.e., intuitiveness thereof is poor.

More commonly, a typical method for processing the interference fringe pattern is a fringe centerline method, and a processing flow thereof includes: 1) denoising an interference fringe pattern to be processed; 2) performing binarization and thinning on the denoised interference fringe pattern; 3) deriving a radius and a center of the interference fringe by acquiring coordinate values of points on the thinned fringes; and 4) calculating other physical parameters, such as the curvature radius, of the unit to be measured, by using radius of two orders of bright or dark fringes and the wavelength of light. It can be seen that the fringe centerline method has a higher automation degree and a better intuitiveness.

However, although the fringe centerline method has the higher automation degree, it is very sensitive to influence of noise in the processing procedure. Therefore, the estimation accuracy of the physical parameters of the unit to be measured significantly relies on the quality of the interference fringe pattern. For example, when an occlusion issue exists in the interference fringe pattern, the physical parameters cannot be estimated accurately.

Therefore, it is desirable to provide an improved scheme for estimating physical parameters.

SUMMARY OF THE INVENTION

In order to solve the above-described technical problem, the present disclosure is proposed. Embodiments of the present disclosure provide a method, device and electronic apparatus for estimating physical parameters, in which a chirp rate parameter and a frequency parameter related to a physical parameter involved in an interferometric measurement can be obtained by discrete chirp Fourier transform on signals of an interference fringe pattern, so that the physical parameter can be estimated with high accuracy and stably.

According to an aspect of the present disclosure, a method for estimating physical parameters is provided, including: reading a Newton's rings fringe pattern obtained by performing an interferometric measurement on a unit to be measured; obtaining the number and length of first-direction signals of the Newton's rings fringe pattern; performing, for each of the first-direction signals, a discrete chirp Fourier transform (DCFT) on the first-direction signal based on each first chirp rate parameter within a range of the length of first-direction signals, to obtain a first magnitude spectrum of an intensity distribution signal of a first-direction pixel set of each first-direction signal of the Newton's rings fringe pattern under each first chirp rate parameter in a DCFT domain, the first-direction pixel set including a line of pixels in a first direction that is one of a row direction and a column direction of the Newton's rings fringe pattern; determining a first chirp rate parameter and a first frequency parameter corresponding to a first magnitude peak value based on the first magnitude spectrum; and estimating the physical parameters involved in the interferometric measurement at least according to the first chirp rate parameter and first frequency parameter corresponding to the first magnitude peak value.

The method for estimating physical parameters further includes: obtaining the number and length of second-direction signals of the Newton's rings fringe pattern; performing, for each of the second-direction signals, a DCFT on the second-direction signal based on each second chirp rate parameter within a range of the length of second-direction signals, to obtain a second magnitude spectrum of an intensity distribution signal of a second-direction pixel set of each second-direction signal of the Newton's rings fringe pattern under each second chirp rate parameter in the DCFT domain, the second-direction pixel set including a line of pixels in a second direction that is the other of the row direction and the column direction of the Newton's rings fringe pattern; determining a second chirp rate parameter and a second frequency parameter corresponding to a second magnitude peak value based on the second magnitude spectrum; and estimating the physical parameters involved in the interferometric measurement at least according to the first chirp rate parameter and first frequency parameter corresponding to the first magnitude peak value, and the second chirp rate parameter and second frequency parameter corresponding to the second magnitude peak value.

In the method for estimating physical parameters, the step of estimating the physical parameters involved in the interferometric measurement at least according to the first chirp rate parameter and first frequency parameter corresponding to the first magnitude peak value, and the second chirp rate parameter and second frequency parameter corresponding to the second magnitude peak value includes: multiplying the square of the length of first-direction signals by the square of the spacing of sampling points in the first direction and dividing by the product of the wavelength of incident light corresponding to the Newton's rings fringe pattern and the first chirp rate to calculate a radius of a Newton's rings in the first direction; and, multiplying the length of first-direction signals by the first frequency parameter and the spacing of sampling points in the first direction and dividing by the negative number of the product of 2 and the first chirp rate to calculate a coordinate of a center of the Newton's rings in the first direction.

In the method for estimating physical parameters, the step of estimating the physical parameters involved in the interferometric measurement at least according to the first chirp rate parameter and first frequency parameter corresponding to the first magnitude peak value, and the second chirp rate parameter and second frequency parameter corresponding to the second magnitude peak value further includes: dividing the sum of radiuses of the Newton's rings in the first direction and the second direction by 2 to calculate a curvature radius of a plano-convex lens that generates the Newton's rings.

In the method for estimating physical parameters, the denominator of the sampling frequency of the discrete chirp Fourier transform is the number of sampling points.

The method for estimating physical parameters, after the step of reading a Newton's rings fringe pattern obtained by performing an interferometric measurement on a unit to be measured, further includes: removing a background intensity from the Newton's rings fringe pattern.

The method for estimating physical parameters, after the step of removing a background intensity from the Newton's rings fringe pattern, further includes: converting the intensity distribution signal of the first-direction pixel set in the background-intensity-removed Newton's rings fringe pattern from a real number form into a complex number form.

The method for estimating physical parameters, after the step of estimating the physical parameters involved in the interferometric measurement at least according to the first chirp rate parameter and first frequency parameter corresponding to the first magnitude peak value, further includes: correcting the physical parameters using an intensity distribution model of the Newton's rings fringe pattern and pixel intensity values in the Newton's rings fringe pattern by taking the estimated physical parameters as initial values for a least square fitting method.

The method for estimating physical parameters further includes: comparing the estimated physical parameters with reference physical parameters to determine differences therebetween; judging whether the differences are larger than or equal to predetermined thresholds; and determining that the unit to be measured does not conform to a specification for the unit, otherwise, determining that the unit to be measured conforms to the specification for the unit, in response to the differences being larger than or equal to the predetermined thresholds.

In the method for estimating physical parameters, the unit to be measured is an optical fiber connector having an end face to be measured, and the physical parameters include a curvature radius and a vertex position of the end face.

According to another aspect of the present disclosure, a method for estimating physical parameters is provided, including: reading an interference fringe pattern having a quadratic phase obtained by performing an interferometric measurement on a unit to be measured; obtaining the number and length of row-direction signals and the number and length of column-direction signals of the interference fringe pattern; performing, for each of the row-direction signals, a discrete chirp Fourier transform (DCFT) on the row-direction signal based on each row chirp rate parameter within a range of the length of row-direction signals, to obtain a row magnitude spectrum of an intensity distribution signal of a row-direction pixel set of each row-direction signal of the interference fringe pattern under each row chirp rate parameter in a DCFT domain, the row-direction pixel set including a line of pixels in a row direction; determining a row chirp rate parameter and a row frequency parameter corresponding to a row magnitude peak value based on the row magnitude spectrum; performing, for each of the column-direction signals, a DCFT on the column-direction signal based on each column chirp rate parameter within a range of the length of column-direction signals, to obtain a column magnitude spectrum of an intensity distribution signal of a column-direction pixel set of each column-direction signal of the interference fringe pattern under each column chirp rate parameter in the DCFT domain, the column-direction pixel set including a line of pixels in a column direction; determining a column chirp rate parameter and a column frequency parameter corresponding to a column magnitude peak value based on the column magnitude spectrum; and, estimating the physical parameters involved in the interferometric measurement at least according to the row chirp rate parameter, the row frequency parameter, the column chirp rate parameter, and the column frequency parameter.

The method for estimating physical parameters, before the step of reading an interference fringe pattern obtained by performing an interferometric measurement on a unit to be measured, further includes: receiving the interference fringe pattern having a complex phase higher than the quadratic phase obtained by performing the interferometric measurement on the unit to be measured; and piecewise-approximating the interference fringe pattern having the complex phase higher than the quadratic phase into a plurality of interference fringe patterns having the quadratic phase.

The method for estimating physical parameters, after the step of estimating the physical parameters involved in the interferometric measurement at least according to the row chirp rate parameter, the row frequency parameter, the column chirp rate parameter, and the column frequency parameter, further includes: synthesizing the physical parameters estimated with respect to each of the plurality of interference fringe patterns having the quadratic phase to generate a synthesized physical parameter.

According to still another aspect of the present disclosure, a device for estimating physical parameters is provided, including: a fringe pattern reading unit for reading a Newton's rings fringe pattern obtained by performing an interferometric measurement on a unit to be measured; a signal parameter obtaining unit for obtaining the number and length of first-direction signals of the Newton's rings fringe pattern; a magnitude spectrum calculating unit for performing, for each of the first-direction signals, a discrete chirp Fourier transform (DCFT) on the first-direction signal based on each first chirp rate parameter within a range of the length of first-direction signals, to obtain a first magnitude spectrum of an intensity distribution signal of a first-direction pixel set of each first-direction signal of the Newton's rings fringe pattern under each first chirp rate parameter in a DCFT domain, the first-direction pixel set including a line of pixels in a first direction that is one of a row direction and a column direction of the Newton's rings fringe pattern; a frequency parameter determining unit for determining a first chirp rate parameter and a first frequency parameter corresponding to a first magnitude peak value based on the first magnitude spectrum; and a physical parameter estimating unit for estimating the physical parameters involved in the interferometric measurement at least according to the first chirp rate parameter and first frequency parameter corresponding to the first magnitude peak value.

In the device for estimating physical parameters, the signal parameter obtaining unit is further configured to obtain the number and length of second-direction signals of the Newton's rings fringe pattern; the magnitude spectrum calculating unit is further configured to perform, for each of the second-direction signals, a DCFT on the second-direction signal based on each second chirp rate parameter within a range the length of second-direction signals, to obtain a second magnitude spectrum of an intensity distribution signal of a second-direction pixel set of each second-direction signal of the Newton's rings fringe pattern under each second chirp rate parameter in the DCFT domain, the second-direction pixel set includes a line of pixels in a second direction that is the other of the row direction and the column direction of the Newton's rings fringe pattern; the frequency parameter determining unit is further configured to determine a second chirp rate parameter and a second frequency parameter corresponding to a second magnitude peak value based on the second magnitude spectrum; and the physical parameter estimating unit is configured to estimate the physical parameters involved in the interferometric measurement at least according to the first chirp rate parameter and first frequency parameter corresponding to the first magnitude peak value, and the second chirp rate parameter and second frequency parameter corresponding to the second magnitude peak value.

According to a further aspect of the present disclosure, a device for estimating physical parameters is provided, including: a fringe pattern reading unit for reading an interference fringe pattern having a quadratic phase obtained by performing an interferometric measurement on a unit to be measured; a signal parameter obtaining unit for obtaining the number and length of row-direction signals and the number and length of column-direction signals of the interference fringe pattern; a row magnitude spectrum calculating unit for performing, for each of the row-direction signals, a discrete chirp Fourier transform (DCFT) on the row-direction signal based on each row chirp rate parameter within a range of the length of row-direction signals, to obtain a row magnitude spectrum of an intensity distribution signal of a row-direction pixel set of each row-direction signal of the interference fringe pattern under each row chirp rate parameter in a DCFT domain, the row-direction pixel set including a line of pixels in a row direction; a row frequency parameter determining unit for determining a row chirp rate parameter and a row frequency parameter corresponding to a row magnitude peak value based on the row magnitude spectrum; a column magnitude spectrum calculating unit for performing, for each of the column-direction signals, a DCFT on the column-direction signal based on each column chirp rate parameter within a range of the length of column-direction signals, to obtain a column magnitude spectrum of an intensity distribution signal of a column-direction pixel set of each column-direction signal of the interference fringe pattern under each column chirp rate parameter in the DCFT domain, the column-direction pixel set including a line of pixels in a column direction; a column frequency parameter determining unit for determining a column chirp rate parameter and a column frequency parameter corresponding to a column magnitude peak value based on the column magnitude spectrum; and a physical parameter estimating unit for estimating the physical parameters involved in the interferometric measurement at least according to the row chirp rate parameter, the row frequency parameter, the column chirp rate parameter, and the column frequency parameter.

According to a still further aspect of the present disclosure, an electronic apparatus is provided, including: a processor; and a memory storing computer program instructions thereon that, when executed by the processor, cause the processor to perform the above-described methods for estimating physical parameters.

According to another aspect of the present disclosure, a computer-readable medium storing computer program instructions thereon that, when executed by a processor, cause the processor to perform the above-described methods for estimating physical parameters.

Compared to the prior art, the method, device, and electronic apparatus for estimating physical parameters provided by the present disclosure are not sensitive to noise of the Newton's rings fringe pattern in the procedure of estimation. Due to energy aggregation of chirp signals in the DCFT domain, various physical parameters involved in the interferometric measurement can be estimated simultaneously with high accuracy even in presence of noise and obstacles in the Newton's rings fringe pattern. Moreover, the procedure of estimation is not influenced by human factors so that artificial errors are reduced. In addition, because the estimated physical parameters are linearly related to the chirp rate parameters and frequency parameters obtained by DCFT, the error stability of the estimation results is improved.

BRIEF DESCRIPTION OF THE DRAWINGS

The above-described and other purposes, characteristics and advantages would become more apparent by describing embodiments of the present disclosure in more detail in combination with accompanying drawings. The accompanying drawings are intended to provide further understanding of the embodiments of the present disclosure and constitute a part of specification, and to explain the present disclosure together with the embodiments of the present disclosure, instead of constituting limitation to the present disclosure. In the drawings, same reference numbers generally designate same elements or steps.

FIG. 2A illustrates a schematic diagram of a core optical path for generating a Newton's rings fringe pattern according to an embodiment of the present disclosure.

FIG. 2B illustrates a schematic diagram of a Newton's rings fringe pattern according to an embodiment of the present disclosure.

FIG. 3 illustrates an effect diagram of discrete chirp Fourier transform for detecting a one-dimensional chirp signal.

DETAILED DESCRIPTION OF THE PREFERRED EMBODIMENT

Figure 1:
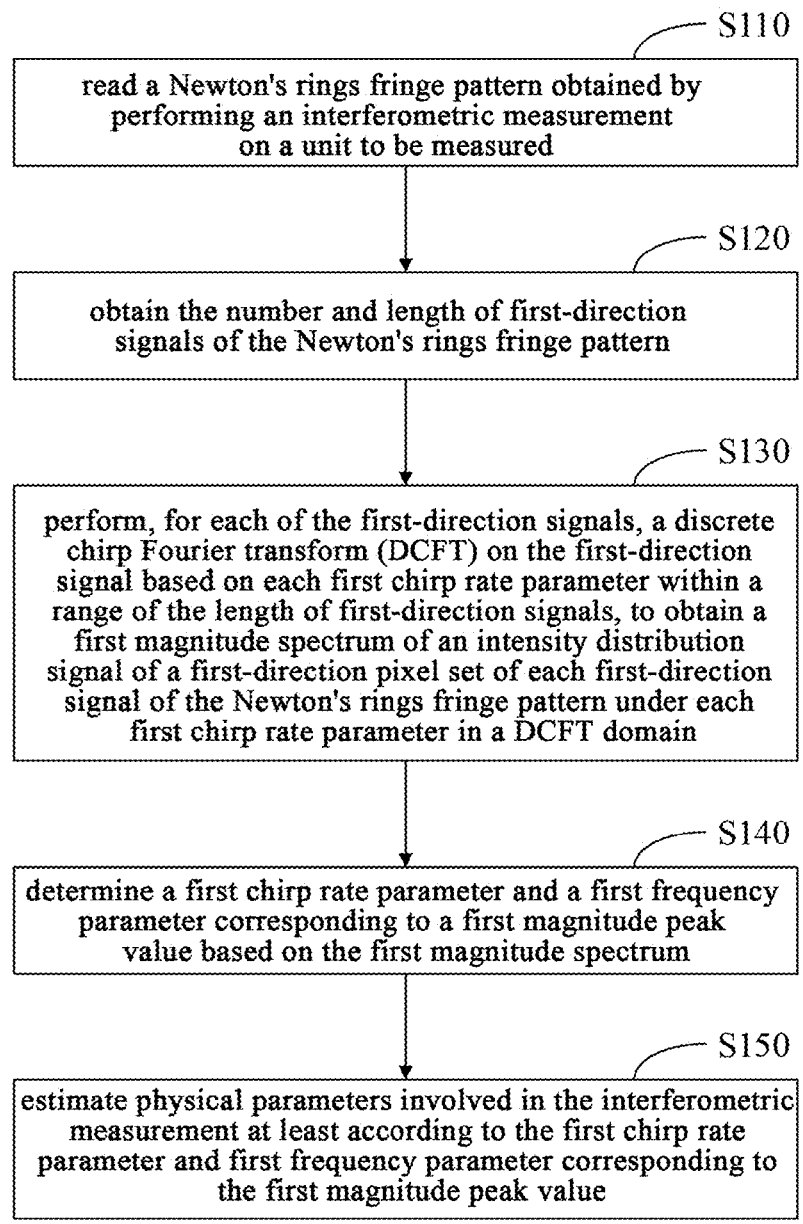
FIG. 1 illustrates a flow chart of a physical parameter estimating method according to an embodiment of the present disclosure.

Hereinafter, exemplary embodiments according to the present disclosure are described in detail with reference to the accompanying drawings. It is obvious that the described embodiments are only a part of embodiments of the present disclosure but not all of the embodiments of the present disclosure. And, it should be understood that the present disclosure is not limited to the exemplary embodiments described herein.

Overview of the Present Disclosure

As a basic interference fringe pattern, a Newton's rings fringe pattern is often encountered in interferometric measurements. Curvature radius, vertex position, wavelength of incident light, refractive index of media, and other physical parameters related to a geometry route of a unit to be measured may be obtained by analyzing and processing the Newton's rings fringe pattern.

An existing and typical method for processing the Newton's rings fringe pattern is the fringe centerline method, and a processing flow thereof includes: reading the Newton's rings fringe pattern; performing pre-processing such as denoising the Newton's rings fringe pattern; performing binarization and thinning on the denoised Newton's rings fringe pattern to obtain "skeleton" of the original image, i.e., maximum values or minimum values of the fringe intensity; acquiring coordinate values of points on the thinned fringes (i.e., on the fringe centerlines having only a width of one pixel) and deriving radiuses and the center of the fringes by using the theorem that three points can determinate a circle; and finally, calculating curvature radius R of a surface to be measured from radiuses $r_k$ and $r_{k+m}$ of $k^{th}$-order and $k+m^{th}$-order dark fringes (where k and m are both natural numbers) and wavelength $\lambda_0$ of incident light by using the following equation (1):

$$R = \frac{r_{k+m}^2 - r_k^2}{m\lambda_0} \quad (1)$$

The existing fringe centerline method has the following disadvantages: the denoising operation must be performed prior to extracting the skeleton lines because this algorithm is very sensitive to influence of noise in the processing procedure and the estimation accuracy significantly relies on the quality of the fringe pattern. When there is a certain amount of noise and obstacles in the Newton's rings fringe pattern, this method cannot estimate the physical parameters of the unit to be measured with relative high accuracy.

It is found through analysis that, after being simplified, a mathematical expression of an intensity distribution signal of pixels in the Newton's rings fringe pattern has a form similar to that of a two-dimension (2-D) chirp signal. Fractional Fourier transform (FRFT) can be regarded as a generalization of Fourier transform (FT), and understood as a chirp-based decomposition. Accordingly, a magnitude spectrum of the intensity distribution signal of the pixels in the Newton's rings fringe pattern within an FRFT order search range can be calculated, a FRFT matched order of the intensity distribution signal is determined by using energy aggregation of chirp signals in the FRFT domain, and the physical parameter of the unit to be measured is estimated according to the matched order by using a mathematical relationship.

However, in the process of estimating a signal parameter through FRFT and further estimating the physical parameter of the unit to be measured, it is found that the error stability of the estimation result is poor, that is, the error variance of the estimation result is large.

Therefore, based on the above technical problems, the basic idea of the embodiments of the present disclosure is to process the signals of the Newton's rings fringe pattern by Chirp-Fourier Transform (CFT), so as to estimate the physical parameter of the unit to be measured.

Specifically, the embodiments of the present disclosure propose a novel method, device and electronic apparatus for estimating physical parameters, and a computer program product and a computer-readable storage medium thereof. A Newton's rings fringe pattern obtained by performing an interferometric measurement on a unit to be measured is first read, the number and length of first-direction signals of the Newton's rings fringe pattern are obtained, then, for each of the first-direction signals, a discrete chirp Fourier transform (DCFT) is performed on the first-direction signal based on each first chirp rate parameter within a range of the length of first-direction signals, to obtain a first magnitude spectrum of an intensity distribution signal of a first-direction pixel set of each first-direction signal of the Newton's rings fringe pattern under each first chirp rate parameter in a DCFT domain, the first-direction pixel set includes a line of pixels in a first direction that is one of a row direction and a column direction of the Newton's rings fringe pattern, a first chirp rate parameter and a first frequency parameter corresponding to a first magnitude peak value are determined based on the first magnitude spectrum, and finally the physical parameters involved in the interferometric measurement is estimated at least according to the first chirp rate parameter and first frequency parameter corresponding to the first magnitude peak value.

Therefore, the DCFT-based method for estimating physical parameters according to the embodiments of the present disclosure makes it possible to estimate the physical parameters of the unit to be measured with high accuracy even in presence of noise and obstacles in the Newton's rings fringe pattern.

At the same time, because the estimated physical parameters are linearly related to the chirp rate parameters and frequency parameters obtained by DCFT, the error stability of the estimation results is improved.

After introducing the basic principle of the present disclosure, various non-restrictive embodiments of the present disclosure will be described in detail with reference to accompanying drawings.

Exemplary Method

FIG. 1 illustrates a flow chart of a method for estimating physical parameters according to an embodiment of the present disclosure.

As shown in FIG. 1, the method for estimating physical parameters according to a first embodiment of the present disclosure includes that: S110, a Newton's rings fringe pattern obtained by performing an interferometric measurement on a unit to be measured is read; S120, the number and length of first-direction signals of the Newton's rings fringe pattern are obtained; S130, for each of the first-direction signals, a discrete chirp Fourier transform (DCFT) is performed on the first-direction signal based on each first chirp rate parameter within a range of the length of first-direction signals, to obtain a first magnitude spectrum of an intensity distribution signal of a first-direction pixel set of each first-direction signal of the Newton's rings fringe pattern under each first chirp rate parameter in a DCFT domain, the first-direction pixel set includes a line of pixels in a first direction that is one of a row direction and a column direction of the Newton's rings fringe pattern; S140, a first chirp rate parameter and a first frequency parameter corresponding to a first magnitude peak value are determined based on the first magnitude spectrum; and S150, the physical parameters involved in the interferometric measurement are estimated at least according to the first chirp rate parameter and first frequency parameter corresponding to the first magnitude peak value.

In S110, a Newton's rings fringe pattern obtained by performing an interferometric measurement on a unit to be measured is read. In the embodiment of the present disclosure, the Newton's rings fringe pattern obtained by performing the interferometric measurement on the unit to be measured can be acquired in various manners. The Newton's rings fringe pattern consists of a series of concentric rings which are sparse on inner side and dense on outer side.

For example, the unit to be measured may be an optical device having a surface to be measured, for example, a spherical surface to be measured, and the Newton's rings fringe pattern may be generated by measuring the surface to be measured of the optical device with a conventional Newton interferometer. It should be appreciated that the present disclosure is not limited thereto. The unit to be measured may be spherical surfaces of various kinds of devices having parameters to be measured. For example, the unit to be measured may be a metal plate or the like, of which parameters such as deformation, displacement or the like need to be measured.

FIG. 2A illustrates a schematic diagram of a core optical path for generating a Newton's rings fringe pattern according to an embodiment of the present disclosure, and FIG. 2B illustrates a schematic diagram of a Newton's rings fringe pattern according to an embodiment of the present disclosure.

As shown in FIG. 2A, an optical device (for example, a plano-convex lens) can be placed on an optical flat glass, and a wedge-shaped gap is formed between a surface of the flat glass and a spherical surface to be measured of the plano-convex lens. The gap is filled with media having a predetermined refractive index $n_0$ (for example, air having the refractive index $n_0$ of 1). When monochrome light of a specific wavelength $\lambda_0$ is irradiated perpendicularly onto the optical device, interferometric fringes can be observed. These fringes are a series of concentric rings centering at the contacting point, i.e., the Newton's rings, as shown in FIG. 2B.

Since diameters of the Newton's rings are too small to be observed and measured directly, a reading microscope can be used for observing and measuring. For example, the Newton's rings can be imaged as an object onto an observing screen with a lens. This observing screen may be image sensors (for example, complementary metal-oxide semiconductor (CMOS) sensors) on a camera, and each photoelectric sensor is referred to as a pixel functioning to convert a light intensity sensed on its area into an electrical signal. In turn, the electrical signals are converted by a circuit into a certain format of digital codes so as to be read into an electronic apparatus such as a computer for subsequent physical parameter estimating processing.

It should be appreciated that the present disclosure is not limited to using the Newton's interferometer to generate the Newton's rings fringe pattern for the unit to be measured. Any known or later-developed methods for generating and reading the Newton's rings fringe pattern can be applied in the method for estimating physical parameters according to the embodiments of the present disclosure, and should be included in the protection scope of the present disclosure.

As shown in FIG. 2B, the Newton's rings fringe pattern is a classic fringe patterns having a quadratic phase, and the brightness or darkness at each pixel position is a grayscale value of the fringe intensity. Moreover, it can be proved that the mathematical expression of the intensity distribution signal of the pixels in the Newton's rings fringe pattern can be simplified and demonstrated as a 2-D chirp signal. In particular, the mathematical model of the Newton's rings fringes is shown in equation (2):

$$I_N = 2I + 2I \cos[(\pi K x^2 - 2\pi K x_0 x + \pi K x_0^2) + (\pi K y^2 - 2\pi K y_0 y + \pi K y_0^2) + \pi] \quad (2)$$

Where $K = 2/(\lambda_0 R)$, R is the curvature radius of the lens, $\lambda_0$ is the wavelength, and $(x_0, y_0)$ is the center position of the Newton's rings.

It can be seen from equation (2) that a certain direct current (DC) component may also exist in the read Newton's rings fringe pattern. The DCFT is a chirp-based decomposition. Therefore, if the DCFT is carried out on the entire Newton's rings fringe pattern directly, there may be some errors in subsequent calculations.

Therefore, in an example of the present disclosure, in order to estimate the physical parameters accurately, after S110, the method for estimating physical parameters may further include that: a background intensity $I_0$ is removed from the Newton's rings fringe pattern.

The background intensity can be removed with various kinds of methods. For example, the background intensity (or referred to as the DC component) may be derived by calculating intensity values $f_N(x, y)$ of all pixels in the Newton's rings fringe pattern, summing them up and calculating the average value thereof, and then, the background intensity is subtracted at each pixel position in the Newton's rings fringe pattern, so as to implement the removing operation. Of course, the present disclosure is not limited thereto. For example, the above-described removing operation may be implemented by filtering out the DC component at the frequency of 0 Hz using a low-pass filter, or an adaptive filter.

In order to estimate physical parameters effectively, in addition to the background intensity removing operation, the method for estimating physical parameters may further include some other pre-processing steps. For example, in an example of the present disclosure, after removing the background intensity from the Newton's rings fringe pattern, the method for estimating physical parameters may further include that: the intensity distribution signal of the at least one first-direction pixel set in the background-intensity-removed Newton's rings fringe pattern is converted from a real number form into a complex number form. Of course, the present disclosure is not limited thereto. Alternatively, in order to achieve a faster processing speed, the DCFT may be carried out in a real number field directly. This may cause some dispersion at places other than the peak of the magnitude spectrum, and thus the dispersion signal and the peak signal need to be distinguished carefully.

For example, to facilitate subsequent calculation, the intensity distribution signal of a part of pixels (e.g., one or more rows of pixels and/or one or more columns of pixels) or all pixels in the Newton's rings fringe pattern can be converted from the real number distribution to the complex number distribution. The real-to-complex conversion operation can by carried out in various manners. For example, the intensity distribution signal of the Newton's rings fringe pattern can be regarded as a Cosine function, thus, $\varphi(x, y)$ can be derived simply by using an inverse cosine function acos( ). Then, the derived $\varphi(x, y)$ is converted from a real number form into a corresponding complex number form, as expressed in the following equation (3):

$$I_{Nr}(x) = A \exp[j(\pi K x^2 - 2\pi K x_0 x + \phi_y)] = A \exp(j\phi_y)\exp[j(\pi K x^2 - 2\pi K x_0 x)] \quad (3)$$

Of course, the present disclosure is not limited thereto. For example, the real-to-complex conversion operation can be implemented by using a Hilbert transform.

In S120, the number and length of first-direction signals of the Newton's rings fringe pattern are obtained. Here, the number of first-direction signals is the number of samples of the DCFT for the Newton's rings fringe pattern in the first direction.

In S130, for each of the first-direction signals, a discrete chirp Fourier transform (DCFT) is performed on the first-direction signal based on each first chirp rate parameter within a range of the length of first-direction signals, to obtain a first magnitude spectrum of an intensity distribution signal of a first-direction pixel set of each first-direction signal of the Newton's rings fringe pattern under each first chirp rate parameter in a DCFT domain, the first-direction pixel set including a line of pixels in a first direction that is one of a row direction and a column direction of the Newton's rings fringe pattern.

In S140, a first chirp rate parameter and a first frequency parameter corresponding to a first magnitude peak value are determined based on the first magnitude spectrum.

In S150, the physical parameters involved in the interferometric measurement are estimated at least according to the first chirp rate parameter and first frequency parameter corresponding to the first magnitude peak value.

How to perform the DCFT on the signals of the Newton's rings fringe pattern to estimate the physical parameters will be specified below.

A chirp signal with a quadratic phase has a chirp rate parameter and a frequency parameter, and the two parameters contain required physical parameter information. The conventional Fourier transform is to estimate a Fourier spectrum of a signal. When the signal is a chirp signal of a quadratic phase, the Fourier transform can only effectively estimate the frequency of the signal, but cannot match its chirp rate, and will reduce the resolution of the frequency. In contrast, the discrete chirp Fourier transform can estimate both the frequency parameter and the chirp rate.

For the case of using the discrete chirp Fourier transform to process a one-dimensional (1-D) chirp signal, when the signal is a single-component quadratic chirp signal, $$x(n) = W_N^{-(l_0 \cdot n^2 + k_0 \cdot n)}, 0 \leq l_0, k_0 \leq N-1 \quad (4)$$

it is assumed that the chirp rate parameter $l_0$ and frequency parameter $k_0$ of the signal are both integers, the length N of the signal is a prime number. Then, its N-point discrete chirp Fourier transform is:

$$X_c(k, l) = \frac{1}{\sqrt{N}} \sum_{n=0}^{N-1} x(n) W_N^{(l_0 \cdot n^2 + k_0 \cdot n)} = \\ \frac{1}{\sqrt{N}} \sum_{n=0}^{N-1} W_N^{-(l_0 \cdot n^2 + k_0 \cdot n)} W_N^{(ln^2 + k \cdot n)} = \frac{1}{\sqrt{N}} \sum_{n=0}^{N-1} W_N^{(l-l_0) \cdot n^2 + (k-k_0) \cdot n} \quad (5)$$

It can be seen from the amplitude expression of the discrete chirp Fourier transform of the signal x(n) that, when the center frequency k and the chirp rate l completely match, i.e., when $k=k_0$, $l=l_0$, $|X_c(k_0, l_0)|=\sqrt{N}$ can be obtained, and this value is a main lobe amplitude of the discrete chirp Fourier transform $X_c(k, l)$; when k and l cannot completely match $k_0$ and $l_0$, the value of $|X_c(k, l)|$ is not more than 1, and this value is referred to as a side lobe amplitude. The minimum main lobe to side lobe amplitude ratio is $\sqrt{N}$, so the position of a main lobe peak can be easily detected in the discrete chirp Fourier domain, and the coordinate values of this position correspond to the chirp rate and frequency parameters of the chirp signal, respectively. The effect of discrete chirp Fourier transform for detecting the 1-D chirp signal is as shown in FIG. 3. FIG. 3 illustrates an effect diagram of discrete chirp Fourier transform for detecting a one-dimensional chirp signal.

Accordingly, as shown in FIG. 3, an energy concentration phenomenon of the quadratic chirp signal occurs in the discrete chirp Fourier domain, so its chirp rate $l_0$ and center frequency $k_0$ can be estimated by detecting the position of the peak.

In fact, the discrete chirp Fourier transform is subjected to two restrictions when processing the single-component chirp signal. One is that the signal length N needs to be a prime number as much as possible, and the other is that the differences between the chirp rate and frequency and their nearest integers need to be small enough. The effect of detection can be optimal only when the two conditions are satisfied at the same time.

Therefore, in the discrete chirp Fourier transform domain, in order to improve the multi-component quadratic chirp signal recognition and detection effect, the resolutions of the chirp rate and frequency of the discrete chirp Fourier transform need to be enhanced. Here, in applications of Newton's rings interference fringe parameter estimation, the processed signal is a single row or single column of Newton's rings fringe, i.e., a single-component quadratic chirp signal.

Since the discrete chirp Fourier transform can be regarded as obtained by sampling of analog chirp Fourier transform based on $t=n/N^{1/3}$, where $n \in [0, N-1]$ and N is the total number of sampling points. At such a low sampling rate, when the search range of the discrete chirp rate l is more than 1/N, a "picket fence" effect will occur in the transform domain, causing flooding of a real peak value of the signal and detection failure. Only when N is a prime number and both the chirp rate $l_0$ and the frequency $k_0$ are integers, it can be ensured that the peak value in the transform domain is not flooded. If the sampling rate is increased to $t=n/N$ ($n \in [0, N-1]$), the above problems can be effectively solved.

For an analog chirp signal:

$$x_a(t) = \exp[j2\pi(\beta_0 t^2 + \alpha_0 t)](0 \leq \alpha_0, \beta_0 \leq N-1) \quad (6)$$

By sampling with t=n/N, a discretized chirp signal is obtained:

$$x(n) \triangleq x_a\left(\frac{n}{N}\right) = \exp\left[\frac{j2\pi}{N}\left(\frac{\beta_0}{N}n^2 + \alpha_0 n\right)\right] = W_N^{-\left(\frac{\beta_0}{N}\cdot n^2 + \alpha_0 \cdot n\right)} \quad (7)$$

Correspondingly, the definition expression of the discrete chirp Fourier transform is modified as follows:

$$X_c(k, l) = \frac{1}{\sqrt{N}} \sum_{n=0}^{N-1} x(n) W_N^{((l/N)\cdot n^2 + k\cdot n)}, \; 0 \leq l, k \leq N-1 \quad (8)$$

In the modified discrete chirp Fourier transform, parameters $\alpha_0$, $\beta_0$ of the matched signal k and l are used. Compared with the original discrete chirp Fourier transform, in the modified definition, a constant N is more in the quadratic coefficient.

Figure 4A:
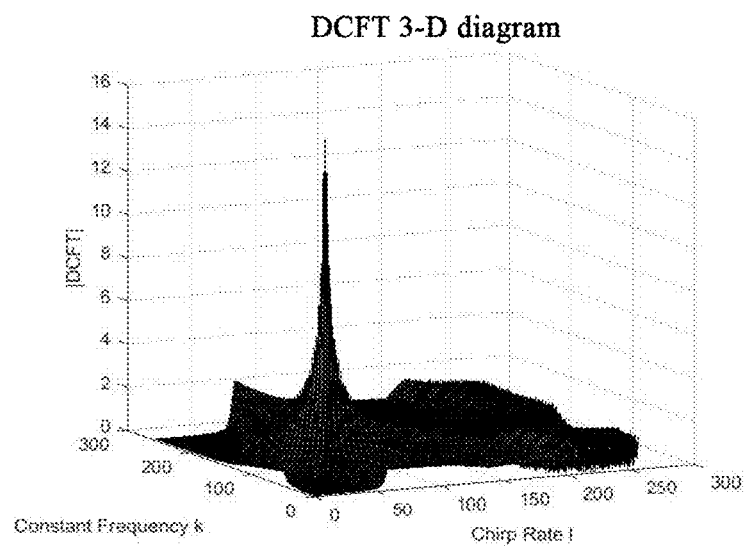
FIGS. 4A and 4B illustrate effects of modified discrete chirp Fourier transform.
Figure 4B:
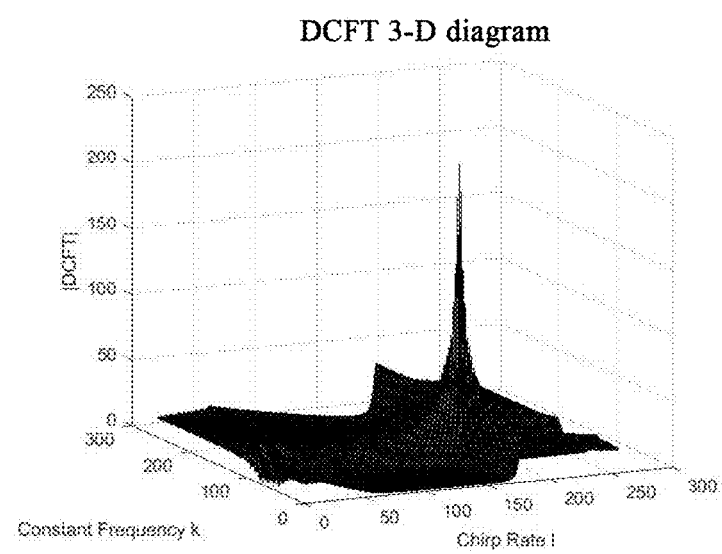

The modified discrete chirp Fourier transform has a higher sampling rate. Since the search range of the quadratic coefficient $l_0/N$ is reduced to $1/N$, the "picket fence" effect is solved, and the restriction that the signal length N is a prime number is eliminated. When the frequency and chirp rate parameters $\alpha_0$, $\beta_0$ of the signal are not integers, the energy concentration phenomenon also occurs in the discrete chirp Fourier domain, and the signal corresponding to the peak in the time domain is closest to the real signal, so corresponding integers $\hat{k}_0$, $\hat{l}_0$ at the peak can be detected as the estimated values of parameters of the real signal. FIGS. 4A and 4B illustrate effects of modified discrete chirp Fourier transform.

As shown in FIGS. 4A and 4B, the increase in sampling rate improves the processing effect of discrete chirp Fourier transform on the single-component chirp signal, that is, the increase in denominator value of the chirp rate parameter l in the transform domain can improve the resolution of chirp rate detection. With the improvement on the resolution of chirp rate detection, the discrete chirp Fourier transform is more robust to chirp rate errors.

The mathematical model of Newton's ring fringe is shown in equation (2). The 2-D fringe pattern can be decomposed into rows or columns for separate processing. Each row and each column are 1-D chirp signals. Taking a row as an example, the corresponding row signal can be expressed as:

$$I_N(x) = \text{rect}(x/2rm)[2I+2I\cos(\pi K x^2 - 2\pi K x_0 x + \varphi_y)] \quad (9)$$

Where $[-r_m, r_m]$ is a signal duration interval, and $\varphi_y$ is a fixed phase. It can be seen that the part related to parameter estimation in the $I_N(x)$ expression only exists in a trigonometric function, so the goal of parameter estimation can be completed only by the analysis on this part. Suppose:

$$\hat{I}_{Nr}(x) = A\cos(\pi K x^2 - 2\pi K x_0 x + \varphi_y) \quad (10)$$

Accordingly, the trigonometric function is transformed into a complex-exponential function, as shown in equation (3).

Here $I_{Nr}(x)$ is a continuous representation of the signal, while the Newton's rings fringe pattern actually processed is a digital image, which is equivalent to discrete processing of the signal. It is assumed here that the signal is sampled at N points, and the spacing of each point is dx, then the value of dx is $1/(N-1)$ of the actual length value of continuous signals, i.e., x=n/N is sampled at a sampling rate of $I_{Nr}(x)$ to obtain:

$$I_{Nr}(n) \triangleq A\exp(j\phi_y)\exp[j(\pi K(ndx)^2 - 2\pi K x_0(ndx))] = \quad (11)$$

$$A_y W_N^{-\left(\frac{NK}{2}(ndx)^2 - NKx_0(ndx)\right)} =$$

$$A_y W_N^{-\left(\frac{N^2 K}{2}dx^2 \cdot \frac{1}{N}n^2 - NKx_0 dxn\right)} = A_y W_N^{-\left(\beta_0 \frac{1}{N}n^2 + \alpha_0 n\right)}$$

In the equation, dx=L/(N-1), L represents the real length of continuous signals, and N is the number of sampling points at this length. Correspondingly, the following equation is derived:

$$\alpha_0 = -NKx_0 dx = -Nx_0 dx \frac{2}{\lambda_0 R} \quad (12)$$

$$\beta_0 = \frac{N^2 K}{2} dx^2 = \frac{N^2}{2} dx^2 \frac{2}{\lambda_0 R} = \frac{N^2}{\lambda_0 R} dx^2$$

$\alpha_0$ and $\beta_0$ represent the frequency and chirp rate parameters of the row signal to be estimated. $I_{Nr}(n)$ is processed using the modified discrete chirp Fourier transform to obtain:

$$X_c(k, l) = \frac{1}{\sqrt{N}} \sum_{n=0}^{N-1} I_{Nr}(n) W_N^{((l/N)\cdot n^2 + k\cdot n)} = \quad (13)$$

$$\frac{1}{\sqrt{N}} \sum_{n=0}^{N-1} A_y W_N^{-\left(\beta_0 \cdot \frac{1}{N}n^2 + \alpha_0 \cdot n\right)} W_N^{((l/N)\cdot n^2 + k\cdot n)} =$$

$$\frac{A_y}{\sqrt{N}} \sum_{n=0}^{N-1} W_N^{(l-\beta_0)\cdot \frac{1}{N}n^2 + (k-\alpha_0)\cdot n}$$

By searching the peak value in the discrete chirp Fourier domain, the estimated values $\alpha_0$, $\beta_0$ of $\hat{\alpha}_0$, $\hat{\beta}_0$ are obtained, and then the curvature radius $R_{row}$ and center abscissa $\hat{x}_0$ of the Newton's rings fringe are inversely derived:

$$\hat{R}_{row} = \frac{N^2 dx^2}{\lambda_0 \hat{\beta}_0} \quad (14)$$

$$\hat{x}_0 = -\frac{\hat{\alpha}_0 Ndx}{2\hat{\beta}_0}$$

Since the center is expressed in the form of a pixel in the fringe pattern, and $\hat{x}_0$ in the above equation is the actual length of the center position, the center abscissa needs to be transformed into pixel coordinates by using round($\hat{x}_0$/dx). Similar processing is performed on the column signal to obtain a column curvature radius and center coordinates $\hat{R}_{col}$, $\hat{y}_0$. Finally, the radiuses obtained by calculating the row and column signals are averaged to obtain the curvature radius R of the Newton's rings to be measured and center coordinates ($\hat{x}_0$, $\hat{y}_0$) of the Newton's rings.

Accordingly, in the method according to the embodiment of the present disclosure, the Newton's rings fringe pattern is processed for row signals and column signals respectively based on the discrete chirp Fourier transform to find a maximum value of peak values of each row signal in the transform domain, the chirp rate parameter $l_0$ and frequency parameter $k_0$ corresponding to the maximum peak value position are detected, and then the row coordinate $x_0$ and row radius $R_{row}$ of the center of the Newton's rings are calculated; similarly, each column signal is processed to obtain the column coordinate $y_0$ and column radius $R_{col}$ of the center of Newton's rings. Here, it could be appreciated by those skilled in the art that, depending on the specific situation, it is also possible to obtain only the row coordinate $x_0$ and row radius $R_{row}$ of the center of the Newton's rings, or the column coordinate $y_0$ and column radius $R_{col}$ of the center of the Newton's rings. For example, only a physical parameter related to the row or column of the Newton's rings fringe pattern is required. Further, by synthesizing the row coordinate $x_0$ and column radius $R_{row}$ of the center of the Newton's rings and the column coordinate $y_0$ and column radius $R_{col}$ of the center of the Newton's rings, a center position $(x_0, y_0)$ of the Newton's rings fringe pattern and a curvature radius R of the plano-convex lens that generates the Newton's rings can be obtained.

Specifically, for a single Newton's rings fringe pattern input, the wavelength of incident light wave that generates the Newton's rings is assumed to be $\lambda_0$. First, the Newton's rings fringe pattern is read to obtain the number Rlength of "row" signals and the number Clength of "column" signals of the pattern. The length value of the row signals is Rlength and the length value of the column signals is Clength. Next, the Newton's rings fringe pattern is traversed from the first row to the Rlength-th row, the chirp rate parameter l is traversed from 0 to Clength under the current "row" signal, discrete Fourier transform is performed on the current "row" signal under the current chirp rate parameter value, and the peak value Rvalue in the DCFT domain and the chirp rate and frequency $(l_0, k_0)$ corresponding to the position of the peak value are recorded; for each "row" signal, the parameters are updated, that is, the current row transform peak value is compared with the previous row transform peak value, and the maximum peak value maxRvalue and the chirp rate parameter $l_{row}$ and frequency parameter $k_{row}$ corresponding to the maximum peak value are obtained and recorded.

Through the chirp rate parameter $l_{row}$ and frequency parameter $k_{row}$ obtained by the "row" transform, equation (14) is modified into equation (15) to calculate the row radius $R_{row}$ and row coordinate $x_0$ of the center of the Newton's rings:

$$R_{row} = \frac{Clength^2 dx^2}{\lambda_0 l_{row}} \quad (15)$$

$$x_0 = -\frac{Clength k_{row} dx}{2 l_{row}}$$

Similarly, for the column direction, the Newton's rings fringe pattern is traversed from the first column to the Clength-th column, the chirp rate parameter l is traversed from 0 to Rlength under the current "column" signal, discrete Fourier transform is performed on the current "column" signal under the current fixed chirp rate parameter value l, and the peak value Cvalue in the DCFT domain and the chirp rate and frequency $(l_0, k_0)$ corresponding to the position of the peak value are recorded; for each "column" signal, the parameters are updated, that is, the current column transform peak value is compared with the previous column transform peak value, and the maximum peak value maxCvalue and the chirp rate parameter $l_{col}$ and frequency parameter $k_{col}$ corresponding to the maximum peak value are obtained and recorded.

Through the chirp rate parameter $l_{col}$ and frequency parameter $k_{col}$ obtained by the "row" transform, equation (14) is modified into equation (16) to calculate the column radius $R_{col}$ and column coordinate $y_0$ of the center of the Newton's rings:

$$R_{col} = \frac{Rlength^2 dx^2}{\lambda_0 l_{col}} \quad (16)$$

$$y_0 = -\frac{Rlength k_{col} dx}{2 l_{col}}$$

In addition, the curvature radius of the plano-convex lens that generates the Newton's rings can be calculated through equation (17):

$$R = (R_{row} + R_{col})/2 \quad (17)$$

Here, it could be appreciated by those skilled in the art that the row parameters of the Newton's rings fringe pattern are first calculated and then the column parameters are calculated as an example above. In the method for estimating physical parameters according to the embodiment of the present disclosure, only one of the row parameters and the column parameters may be calculated.

Accordingly, in the method for estimating physical parameters according to the embodiment of the present disclosure, the first-direction pixel set includes a line of pixels in a first direction, and the first direction is one of a row direction and a column direction of the Newton's rings fringe pattern.

In addition, the method for estimating physical parameters according to the embodiment of the present disclosure further includes that: the number and length of second-direction signals of the Newton's rings fringe pattern are obtained; for each of the second-direction signals, a discrete chirp Fourier transform (DCFT) is performed on the second-direction signal based on each second chirp rate parameter within a range of the length of second-direction signals, to obtain a second magnitude spectrum of an intensity distribution signal of a second-direction pixel set of each second-direction signal of the Newton's rings fringe pattern under each second chirp rate parameter in the DCFT domain, the second-direction pixel set includes a line of pixels in a second direction that is the other of the row direction and the column direction of the Newton's rings fringe pattern; a second chirp rate parameter and a second frequency parameter corresponding to a second magnitude peak value are determined based on the second magnitude spectrum; and the physical parameters involved in the interferometric measurement are estimated at least according to the first chirp rate parameter and first frequency parameter corresponding to the first magnitude peak value, and the second chirp rate parameter and second frequency parameter corresponding to the second magnitude peak value.

In the method for estimating physical parameters, the step of estimating the physical parameters involved in the interferometric measurement at least according to the first chirp rate parameter and first frequency parameter corresponding to the first magnitude peak value, and the second chirp rate parameter and second frequency parameter corresponding to the second magnitude peak value includes that: the square of the length of first-direction signals is multiplied by the square of the spacing of sampling points in the first direction and divided by the product of the wavelength of incident light corresponding to the Newton's rings fringe pattern and the first chirp rate to calculate a radius of a Newton's rings in the first direction; and, the length of first-direction signals is multiplied by the first frequency parameter and the spacing of sampling points in the first direction and divided by the negative number of the product of 2 and the first chirp rate to calculate a coordinate of a center of the Newton's rings in the first direction.

In the method for estimating physical parameters, the step of estimating the physical parameters involved in the interferometric measurement at least according to the first chirp rate parameter and first frequency parameter corresponding to the first magnitude peak value, and the second chirp rate parameter and second frequency parameter corresponding to the second magnitude peak value further includes that: the sum of radiuses of the Newton's rings in the first direction and the second direction is divided by 2 to calculate a curvature radius of a plano-convex lens that generates the Newton's rings.

In the method for estimating physical parameters, the denominator of the sampling frequency of the discrete chirp Fourier transform is the number of sampling points.

For the physical parameters obtained in the above method, there may still be a very small amount of error.

In order to address the above problem, after S150, the method for estimating physical parameters according to the embodiment of the present disclosure may further include that: an error correction is performed on the estimated physical parameters.

Apparently, in different embodiments of the present disclosure, various kinds of error correction methods can be adopted to conduct some fine adjustment to the estimated physical parameters. In one example, the error correction can be performed by using a least square fitting method.

In this case, the step of error correction may include that: the estimated physical parameters are corrected using an intensity distribution model of the Newton's rings fringe pattern and pixel intensity values in the Newton's rings fringe pattern by taking the estimated physical parameters as initial values for a least square fitting method.

The idea of correcting the physical parameters by using the least square fitting method is that: a set of estimated physical parameters is given, intensity distribution of the fringe pattern can be calculated through mathematical expression form of the Newton's rings fringe pattern, a difference between the calculated intensity distribution and the intensity distribution of the Newton's rings fringe pattern to be analyzed is calculated, and the physical parameters corresponding to a minimum value of the squared difference will be the corrected physical parameters.

In one example, obtaining the minimum value of the squared difference can derive the corrected physical parameters by taking a derivative of the difference function with respect to the physical parameters and letting the derivative to be equal to zero.

As mentioned above, the stability of measurement accuracy has a relatively important impact on the actual measurement application. When the size of the Newton's rings interference fringe pattern is constant, the accuracy of the curvature radius estimated by the DCFT-based Newton's rings parameter estimating method is quite stable, while the estimation accuracy of an FRFT-based parameter estimating method fluctuates due to the changes in the center position and occluded area of the Newton's rings.

When the two methods are used to process the Newton's rings interference fringe pattern with centers at different positions respectively, the results of estimating the curvature radius are shown in Table 5.1; and when the two methods are used to process the Newton's rings interference fringe pattern with different degrees of occlusion respectively, the results of estimating the curvature radius are shown in Table 5.2. It is not difficult to see that, when the DCFT-based parameter estimating method is used to process the 720*720 Newton's rings fringe pattern, the estimation error of the obtained curvature radius is stable at 0.6007%; and when the FRFT-based parameter estimating method is used to process the corresponding pattern, the error of the obtained curvature radius fluctuates at 1%.

TABLE 5.1

Processing results of 720*720 Newton's rings with centers at different positions

| Real position/ pixel of center | DCFT_curvature radius error/% | FRFT_curvature radius error/% |
|---|---|---|
| (100, 100) | 0.6007 | 1.4535 |
| (100, 360) | 0.6007 | 1.1526 |
| (100, 600) | 0.6007 | 0.4079 |
| (360, 360) | 0.6007 | 1.1529 |
| (500, 500) | 0.6007 | 0.5227 |
| (600, 100) | 0.6007 | 1.0812 |

TABLE 5.2

Processing results of 720*720 Newton's rings with some interference fringes occluded

| Real position/ pixel of center | Position/ pixel of occluded spot center | Radius/ pixel of occluded spot | DCFT_curvature radius error/% | FRFT_curvature radius error/% |
|---|---|---|---|---|
| (360, 360) | (360, 360) | 100 | 0.6007 | 0.9664 |
| (360, 360) | (360, 360) | 200 | 0.6007 | 0.9664 |
| (360, 360) | (360, 360) | 300 | 0.6007 | 1.4001 |
| (360, 360) | (420, 420) | 100 | 0.6007 | 0.7802 |
| (360, 360) | (420, 420) | 200 | 0.6007 | 0.9118 |
| (360, 360) | (420, 420) | 300 | 0.6007 | 1.8972 |
| (200, 200) | (420, 420) | 100 | 0.6007 | 0.7089 |
| (200, 200) | (420, 420) | 200 | 0.6007 | 0.8950 |
| (200, 200) | (420, 420) | 300 | 0.6007 | 1.4535 |

The reason for the above stability difference is, in the discrete chirp Fourier transform, the chirp rate $l_0$ and frequency $k_0$ are optimal matched values searched within [0, N−1] according to the step size of 1, which is a linear search method; while in the fractional Fourier transform, the estimation issue of the chirp rate and frequency parameters is transformed into a matching choice of a rotation angle $\alpha$. Although the value of $\alpha$ is linear within the range $[\alpha_{min}, \alpha_{max}]$, when it corresponds to the chirp rate $l_\alpha = -NT^2 \cot \alpha/4\pi$ through equation $l_\alpha$, because the cost function is used, the search process of $l_\alpha$ is not linear. The value of the chirp rate l determines the estimation accuracy of the curvature radius. Just the nonlinear search of the chirp rate by FRFT leads to unstable estimation accuracy of the curvature radius of the Newton's rings.

Figure 5:
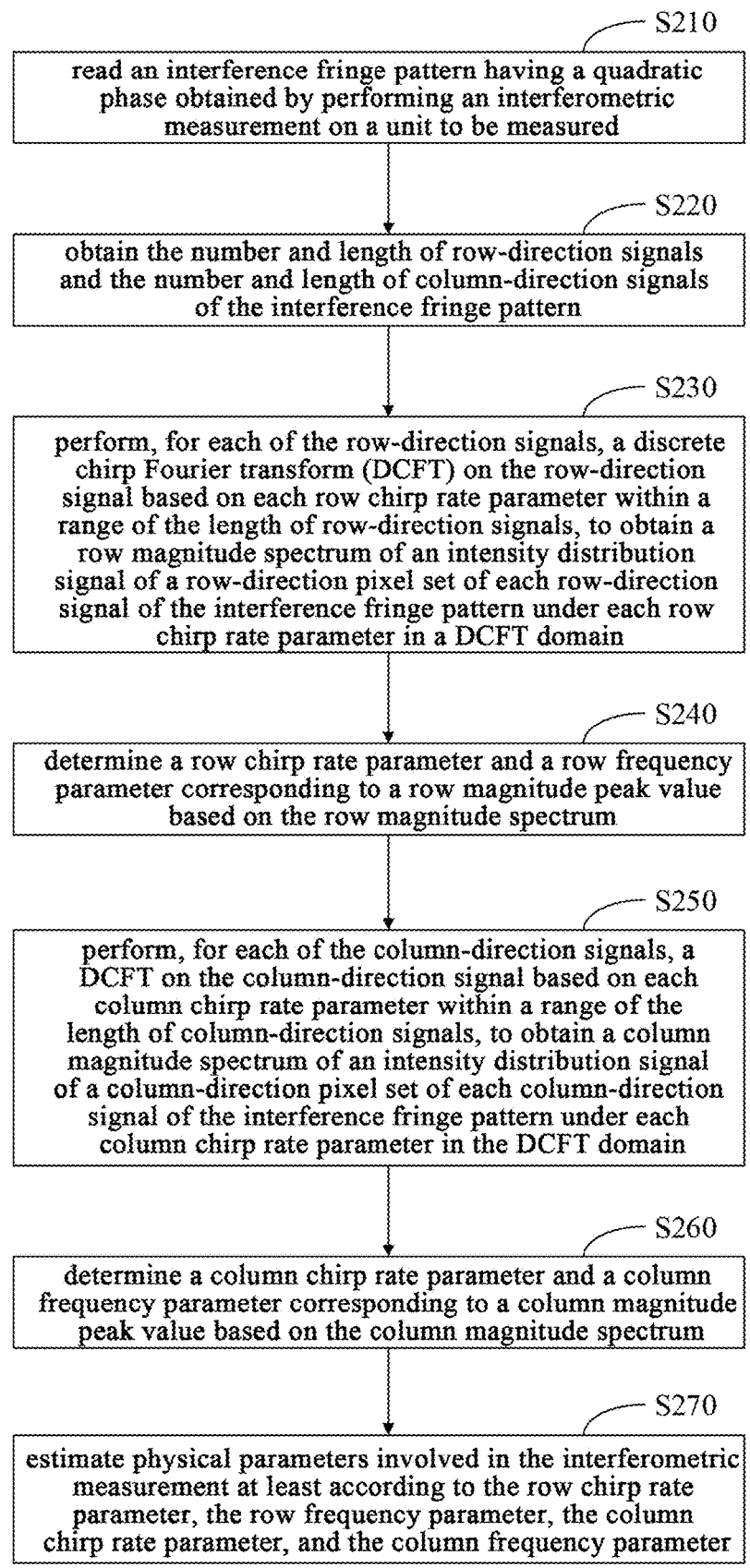
FIG. 5 illustrates a flow chart of another example of a method for estimating physical parameters according to an embodiment of the present disclosure.

FIG. 5 illustrates a flow chart of another example of a method for estimating physical parameters according to an embodiment of the present disclosure.

As shown in FIG. 5, the method for estimating physical parameters according to the embodiment of the present disclosure includes that: S210, an interference fringe pattern having a quadratic phase obtained by performing an interferometric measurement on a unit to be measured is read; S220, the number and length of row-direction signals and the number and length of column-direction signals of the interference fringe pattern are obtained; S230, for each of the row-direction signals, a discrete chirp Fourier transform (DCFT) is performed on the row-direction signal based on each row chirp rate parameter within a range of the length of row-direction signals, to obtain a row magnitude spectrum of an intensity distribution signal of a row-direction pixel set of each row-direction signal of the interference fringe pattern under each row chirp rate parameter in a DCFT domain, the row-direction pixel set includes a line of pixels in a row direction; S240, a row chirp rate parameter and a row frequency parameter corresponding to a row magnitude peak value are determined based on the row magnitude spectrum; S250, for each of the column-direction signals, a DCFT is performed on the column-direction signal based on each column chirp rate parameter within a range of the length of column-direction signals, to obtain a column magnitude spectrum of an intensity distribution signal of a column-direction pixel set of each column-direction signal of the interference fringe pattern under each column chirp rate parameter in the DCFT domain, the column-direction pixel set includes a line of pixels in a column direction; S260, a column chirp rate parameter and a column frequency parameter corresponding to a column magnitude peak value are determined based on the column magnitude spectrum; and S270, the physical parameters involved in the interferometric measurement are estimated at least according to the row chirp rate parameter, the row frequency parameter, the column chirp rate parameter, and the column frequency parameter.

Figure 6A:
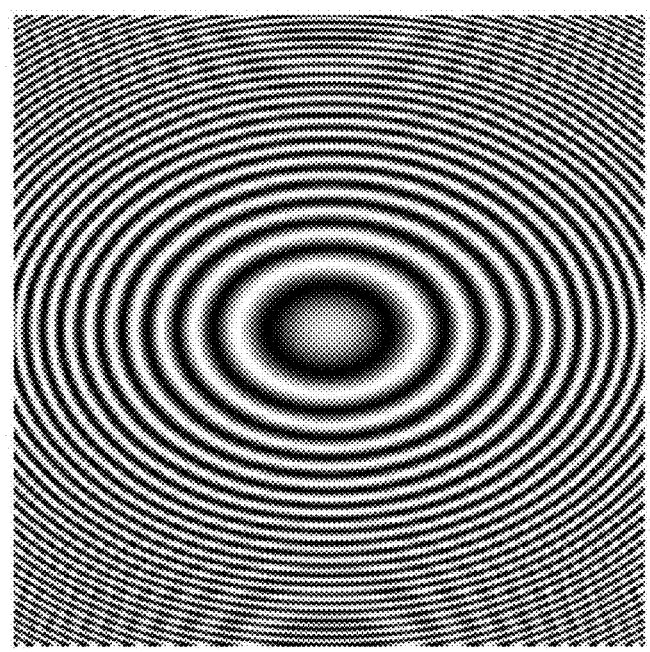
FIGS. 6A and 6B illustrate schematic diagrams of interference fringe patterns each having a quadratic phase according to an embodiment of the present disclosure, respectively.
Figure 6B:
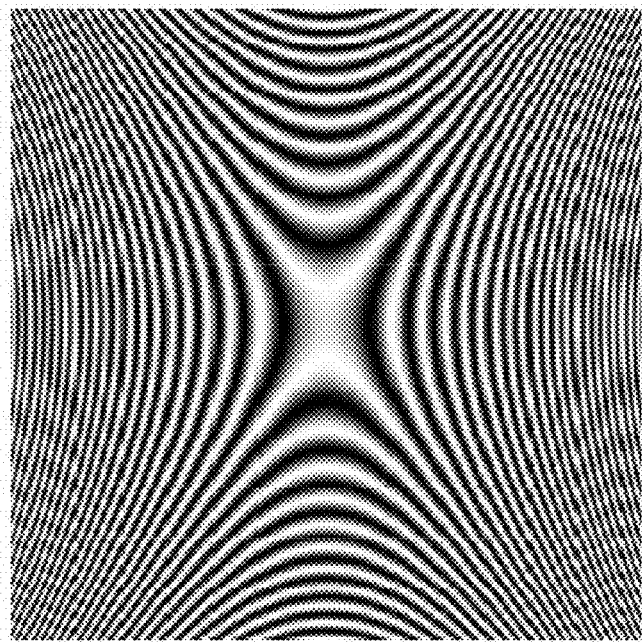

FIGS. 6A and 6B illustrate schematic diagrams of interference fringe patterns each having a quadratic phase according to an embodiment of the present disclosure, respectively.

A closed electronic speckle interference (ESPI) fringe pattern is shown in FIG. 6A, and an unclosed ESPI fringe pattern is shown in FIG. 6B. The ESPI technique is to use a laser speckle as an information carrier of field variation of an object to be measured, so as to detect a phase change of dual laser beams by using relevant fringes of speckle interference field generated by irradiating laser onto the object to be measured. For example, a laser beam is diffused by a lens and projected onto a surface of the object to be measured, and a reflected light has interference with a reference light beam projected from a laser directly to a camera, so as to generate a speckle field and a series of speckle images at the irradiated surface. The ESPI nondestructive detecting technique can implement various kinds of measurements such as displacement, strain, surface defect, and crack.

Of course, the present disclosure is not limited thereto, but may also be applied to other interference fringe patterns having the quadratic phase, for example, the above-described Newton's rings fringe pattern holographic interference fringe patterns, or the like.

Like the Newton's rings fringe pattern, it is proved that, after being simplified, a mathematical expression of an intensity distribution signal of pixels in other fringe patterns having a quadratic phase also has a form similar to the 2-D chirp signal.

Thus it can be seen that, by adopting the method for estimating physical parameters, the interference fringe pattern having the quadratic phase can be further processed on the basis of processing the Newton's rings fringe pattern, so that various physical parameters involved in the interferometric measurement can be estimated with high accuracy simultaneously even in presence of noise and obstacles in the interference fringe pattern. And, the procedure of estimation is not influenced by the human factors so that artificial errors are reduced. In addition, because the estimated physical parameters are linearly related to the chirp rate parameters and frequency parameters obtained by DCFT, the error stability of the estimation results is improved.

It is to be appreciated that, although the present disclosure is described by taking the interference fringe pattern having the quadratic phase as an example in the above two embodiments, the present disclosure is not limited thereto, and the present disclosure can also be applied to interference fringe patterns having other complex phase, as long as the interference fringe pattern can be piecewise-approximated as interference fringe patterns having the quadratic phase.

Therefore, in one example of the embodiment, before S210, the method for estimating physical parameters may also include that: an interference fringe pattern having a complex phase higher than the quadratic phase obtained by performing the interferometric measurement on the unit to be measured is obtained; and the interference fringe pattern having the complex phase is piecewise-approximated into a plurality of interference fringe patterns having the quadratic phase.

Further, in a further example, after S260, the method for estimating physical parameters may also include that: the physical parameters estimated with respect to each of the plurality of interference fringe patterns having the quadratic phase are synthesized to generate a synthesized physical parameter.

For example, a surface shape of the unit to be measured can be obtained by synthesizing various physical parameters of the unit in the x-direction and y-direction.

Exemplary Application Scenario

The method for estimating physical parameters according to various embodiments of the present disclosure can be applied in various kinds of scenarios. For example, it can be applied in teaching experiments or engineering measurements to estimate physical parameters of various kinds of units to be measured. Still further, in the latter scenario, it can be further evaluated whether the unit to be measured conforms to its standard requirement based on the estimated physical parameters.

Therefore, in the present disclosure, for example, after S150 of the first embodiment, or after S270 of the second embodiment, the method may also include that: the estimated physical parameters are compared with reference physical parameters to determine differences therebetween; whether the differences are larger than or equal to predetermined thresholds is judged; and that the unit to be measured does not conform to a specification for the unit is determined; otherwise, that the unit to be measured conforms to the specification for the unit is determined, in response to the differences being larger than or equal to the predetermined thresholds.

Hereinafter, an application scenario of the present disclosure is described by taking detection of an end surface of an optical fiber connector as an example.

The optical fiber connector is used for interfacing two optical fibers together. In the field of communication, in order to ensure signal transmission quality, the polished end face of the optical fiber connector needs to be detected. The detection and control are mainly directed to key geometric parameters, such as curvature radius, apex-offset, inclination angle, undercut of fiber, and roughness of the end surface of the optical fiber connector. In engineering practice, there is a standard on whether the end surface of the optical fiber connector produced is qualified. If various physical parameters of the end surface are in a range specified in the standard, the optical fiber connector is regarded as qualified. The method for estimating physical parameters according to the embodiments of the present disclosure can be used to estimate the curvature radius and the apex-offset of the end surface of the optical fiber connector, so as to decide whether the polished end surface of the optical fiber connector is appropriate for being shipped and brought into use.

Figure 7:
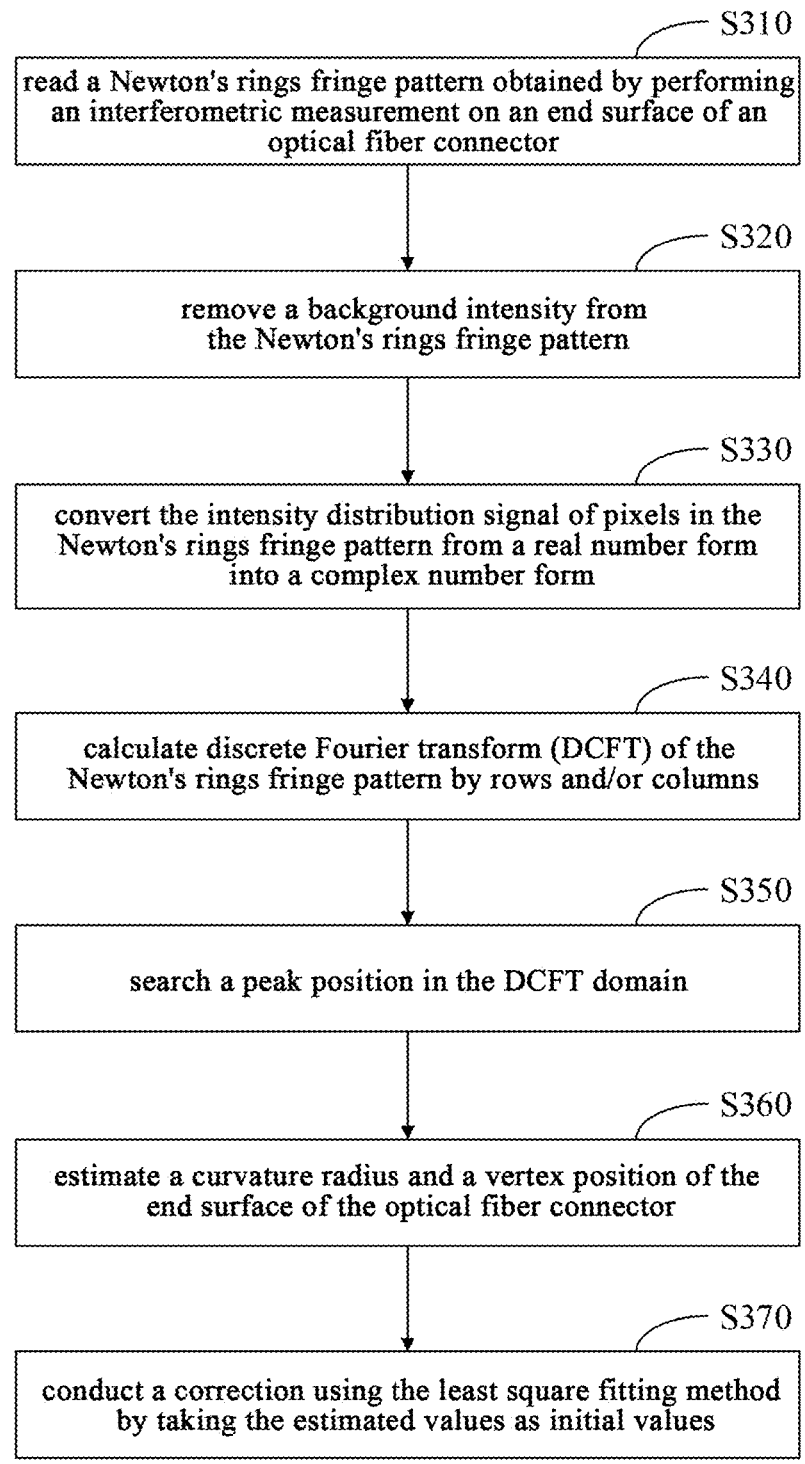
FIG. 7 illustrates a flow chart of an application scenario in which a method for estimating physical parameters according to an embodiment of the present disclosure is used to detect an end surface of an optical fiber connector.

FIG. 7 illustrates a flow chart of an application scenario in which a method for estimating physical parameters according to an embodiment of the present disclosure is used to detect an end surface of an optical fiber connector.

As shown in FIG. 7, a method for detecting an end surface of an optical fiber connector includes:

In S310, a Newton's rings fringe pattern obtained by performing an interferometric measurement on the end surface of the optical fiber connector is read.

In S320, a background intensity is removed from the Newton's rings fringe pattern.

In S330, the intensity distribution signal of pixels in the Newton's rings fringe pattern is converted from a real number form into a complex number form.

In S340, discrete Fourier transform (DCFT) of the Newton's rings fringe pattern is calculated by rows and/or columns.

In S350, a peak position is searched in the DCFT domain.

In S360, a curvature radius and a vertex position of the end surface of the optical fiber connector are estimated.

In S370, a correction is conducted using the least square fitting method by taking the estimated values as initial values.

Since S310 to S370 have been already explained in the above embodiments, the detailed description thereof is omitted here.

In S380, whether the end surface of the optical fiber connector conforms to a specification is judged according to the corrected curvature radius and vertex position.

After obtaining the curvature radius and vertex position of the end surface of the optical fiber connector, they are compared with a production standard. If the curvature radius and vertex position of the end surface are in a range specified in the standard, the optical fiber connector is regarded as qualified; otherwise, it is regarded as defective. For example, after deriving the vertex position of the end surface, a difference between the vertex position and the position of the fiber core is calculated, and this difference (also called apex-offset) is compared with the standard to judge whether the end surface of the optical fiber connector is qualified.

Exemplary Device

Figure 8:
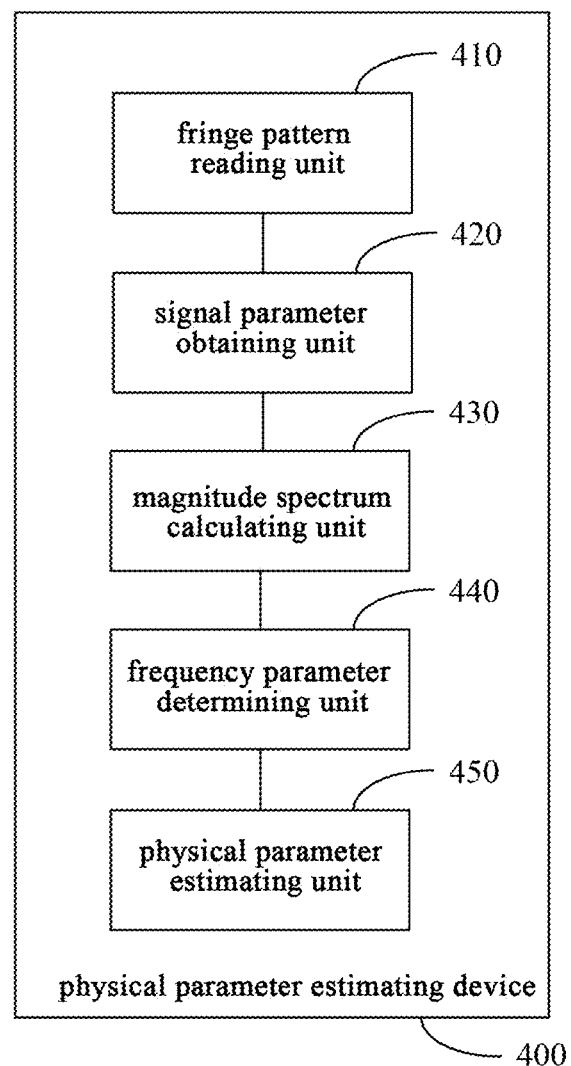
FIG. 8 illustrates a block diagram of a device for estimating physical parameters according to an embodiment of the present disclosure.

FIG. 8 illustrates a block diagram of a device for estimating physical parameters according to an embodiment of the present disclosure.

As shown in FIG. 8, the device 400 for estimating physical parameters according to the embodiment of the present disclosure includes: a fringe pattern reading unit 410 for reading a Newton's rings fringe pattern obtained by performing an interferometric measurement on a unit to be measured; a signal parameter obtaining unit 420 for obtaining the number and length of first-direction signals of the Newton's rings fringe pattern; a magnitude spectrum calculating unit 430 for performing, for each of the first-direction signals, a discrete chirp Fourier transform (DCFT) on the first-direction signal based on each first chirp rate parameter within a range of the length of first-direction signals, to obtain a first magnitude spectrum of an intensity distribution signal of a first-direction pixel set of each first-direction signal of the Newton's rings fringe pattern under each first chirp rate parameter in a DCFT domain, the first-direction pixel set including a line of pixels in a first direction that is one of a row direction and a column direction of the Newton's rings fringe pattern; a frequency parameter determining unit 440 for determining a first chirp rate parameter and a first frequency parameter corresponding to a first magnitude peak value based on the first magnitude spectrum; and a physical parameter estimating unit 450 for estimating the physical parameters involved in the interferometric measurement at least according to the first chirp rate parameter and first frequency parameter corresponding to the first magnitude peak value.

In one example, in the device 400 for estimating physical parameters, the signal parameter obtaining unit 420 is further used for obtaining the number and length of second-direction signals of the Newton's rings fringe pattern; the magnitude spectrum calculating unit 430 is further used for performing, for each of the second-direction signals, a DCFT on the second-direction signal based on each second chirp rate parameter within a range of the length of second-direction signals, to obtain a second magnitude spectrum of an intensity distribution signal of a second-direction pixel set of each second-direction signal of the Newton's rings fringe pattern under each second chirp rate parameter in the DCFT domain, the second-direction pixel set includes a line of pixels in a second direction that is the other of the row direction and the column direction of the Newton's rings fringe pattern; the frequency parameter determining unit 440 is further used for determining a second chirp rate parameter and a second frequency parameter corresponding to a second magnitude peak value based on the second magnitude spectrum; and the physical parameter estimating unit 450 is used for estimating the physical parameters involved in the interferometric measurement at least according to the first chirp rate parameter and first frequency parameter corresponding to the first magnitude peak value, and the second chirp rate parameter and second frequency parameter corresponding to the second magnitude peak value.

In one example, in the device 400 for estimating physical parameters, the physical parameter estimating unit 450 is used for: multiplying the square of the length of first-direction signals by the square of the spacing of sampling points in the first direction and dividing by the product of the wavelength of incident light corresponding to the Newton's rings fringe pattern and the first chirp rate to calculate a radius of a Newton's rings in the first direction; and, multiplying the length of first-direction signals by the first frequency parameter and the spacing of sampling points in the first direction and dividing by the negative number of the product of 2 and the first chirp rate to calculate a coordinate of a center of the Newton's rings in the first direction.

In one example, in the device 400 for estimating physical parameters, the physical parameter estimating unit 450 is further used for dividing the sum of radiuses of the Newton's rings in the first direction and the second direction by 2 to calculate a curvature radius of a plano-convex lens that generates the Newton's rings.

In one example, in the device 400 for estimating physical parameters, the denominator of the sampling frequency of the discrete chirp Fourier transform is the number of sampling points.

In one example, the device 400 for estimating physical parameters further includes a background intensity removing unit for removing, after reading the Newton's rings fringe pattern obtained by performing the interferometric measurement on the unit to be measured, background intensity from the Newton's rings fringe pattern.

In one example, the device 400 for estimating physical parameters further includes a complex form converting unit for converting, after removing the background intensity from the Newton's rings fringe pattern, the intensity distribution signal of the first-direction pixel set in the background-intensity-removed Newton's rings fringe pattern from a real number form into a complex number form.

In one example, the device 400 for estimating physical parameters further includes a physical parameter correcting unit for correcting, after estimating the physical parameters involved in the interferometric measurement at least according to the first chirp rate parameter and first frequency parameter corresponding to the first magnitude peak value, the physical parameters using an intensity distribution model of the Newton's rings fringe pattern and pixel intensity values in the Newton's rings fringe pattern by taking the estimated physical parameters as initial values for a least square fitting method.

In one example, the device 400 for estimating physical parameters further includes a unit-to-be-measured checking unit for comparing the estimated physical parameters with reference physical parameters to determine differences therebetween; judging whether the differences are larger than or equal to predetermined thresholds; and determining that the unit to be measured does not conform to a specification for the unit, otherwise, determining that the unit to be measured conforms to the specification for the unit, in response to the differences being larger than or equal to the predetermined thresholds.

In one example, in the device 400 for estimating physical parameters, the unit to be measured is an optical fiber connector having an end face to be measured, and the physical parameters include a curvature radius and a vertex position of the end face.

Figure 9:
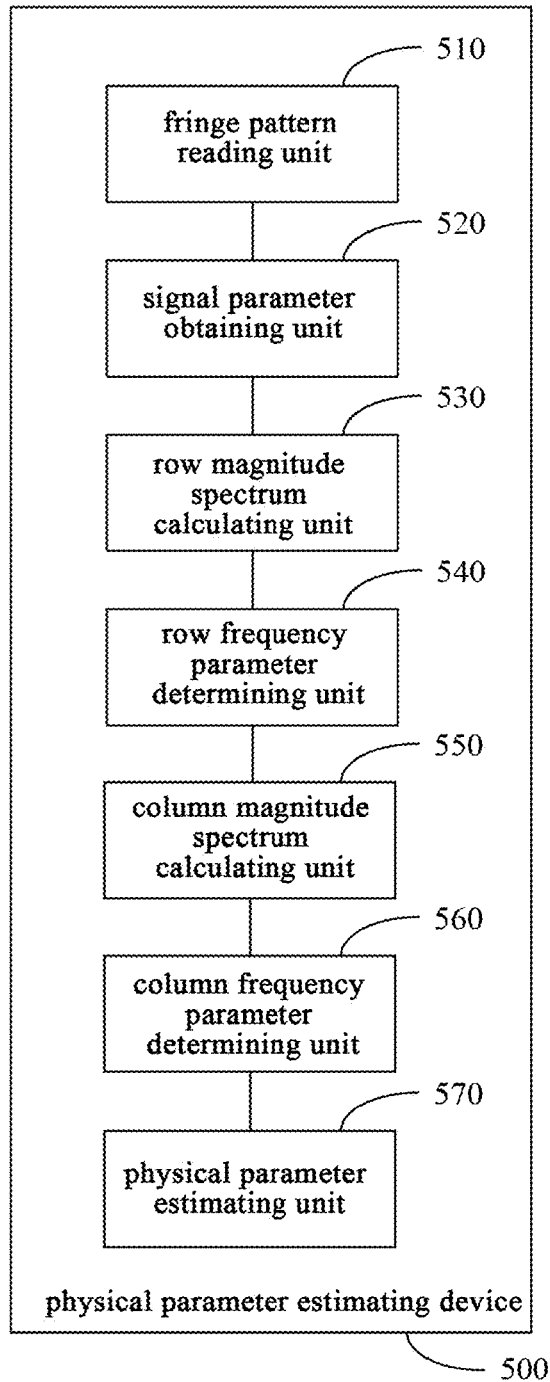
FIG. 9 illustrates a block diagram of another example of a device for estimating physical parameters according to an embodiment of the present disclosure.

FIG. 9 illustrates a block diagram of another example of a device for estimating physical parameters according to an embodiment of the present disclosure.

As shown in FIG. 9, the device 500 for estimating physical parameters according to the embodiment of the present disclosure includes: a fringe pattern reading unit 510 for reading an interference fringe pattern having a quadratic phase obtained by performing an interferometric measurement on a unit to be measured; a signal parameter obtaining unit 520 for obtaining the number and length of row-direction signals and the number and length of column-direction signals of the interference fringe pattern; a row magnitude spectrum calculating unit 530 for performing, for each of the row-direction signals, a discrete chirp Fourier transform (DCFT) on the row-direction signal based on each row chirp rate parameter within a range of the length of row-direction signals, to obtain a row magnitude spectrum of an intensity distribution signal of a row-direction pixel set of each row-direction signal of the interference fringe pattern under each row chirp rate parameter in a DCFT domain, the row-direction pixel set including a line of pixels in a row direction; a row frequency parameter determining unit 540 for determining a row chirp rate parameter and a row frequency parameter corresponding to a row magnitude peak value based on the row magnitude spectrum; a column magnitude spectrum calculating unit 550 for performing, for each of the column-direction signals, a DCFT on the column-direction signal based on each column chirp rate parameter within a range of the length of column-direction signals, to obtain a column magnitude spectrum of an intensity distribution signal of a column-direction pixel set of each column-direction signal of the interference fringe pattern under each column chirp rate parameter in the DCFT domain, the column-direction pixel set including a line of pixels in a column direction; a column frequency parameter determining unit 560 for determining a column chirp rate parameter and a column frequency parameter corresponding to a column magnitude peak value based on the column magnitude spectrum; and a physical parameter estimating unit 570 for estimating the physical parameters involved in the interferometric measurement at least according to the row chirp rate parameter, the row frequency parameter, the column chirp rate parameter, and the column frequency parameter.

In one example, in the device 500 for estimating physical parameters, the physical parameter estimating unit 570 is used for multiplying the square of the length of row-direction signals by the square of the spacing of sampling points in the row direction and dividing by the product of the wavelength of incident light corresponding to the Newton's rings fringe pattern and the row chirp rate to calculate a radius of a Newton's rings in the row direction; multiplying the length of row-direction signals by the row frequency parameter and the spacing of sampling points in the row direction and dividing by the negative number of the product of 2 and the row chirp rate to calculate a coordinate of a center of the Newton's rings in the row direction; multiplying the square of the length of column-direction signals by the square of the spacing of sampling points in the column direction and dividing by the product of the wavelength of incident light corresponding to the Newton's rings fringe pattern and the column chirp rate to calculate a radius of the Newton's rings in the column direction; and multiplying the length of column-direction signals by the column frequency parameter and the spacing of sampling points in the column direction and dividing by the negative number of the product of 2 and the column chirp rate to calculate a coordinate of the center of the Newton's rings in the column direction.

In one example, in the device 500 for estimating physical parameters, the physical parameter estimating unit 570 is further used for dividing the sum of radiuses of the Newton's rings in the row direction and the column direction by 2 to calculate a curvature radius of a plano-convex lens that generates the Newton's rings.

In one example, in the device 500 for estimating physical parameters, the denominator of the sampling frequency of the discrete chirp Fourier transform is the number of sampling points.

In one example, the device 500 for estimating physical parameters further includes a background intensity removing unit for removing, after reading the Newton's rings fringe pattern obtained by performing the interferometric measurement on the unit to be measured, background intensity from the Newton's rings fringe pattern.

In one example, the device 500 for estimating physical parameters further includes a complex form converting unit for converting, after removing the background intensity from the Newton's rings fringe pattern, the intensity distribution signal of the first-direction pixel set in the background-intensity-removed Newton's rings fringe pattern from a real number form into a complex number form.

In one example, the device 500 for estimating physical parameters further includes a physical parameter correcting unit for correcting, after estimating the physical parameters involved in the interferometric measurement at least according to the row chirp rate parameter and row frequency parameter corresponding to the row magnitude peak value and the column chirp rate parameter and column frequency parameter corresponding to the column magnitude peak value, the physical parameters using an intensity distribution model of the Newton's rings fringe pattern and pixel intensity values in the Newton's rings fringe pattern by taking the estimated physical parameters as initial values for a least square fitting method.

In one example, the device 500 for estimating physical parameters further includes a unit-to-be-measured checking unit for comparing the estimated physical parameters with reference physical parameters to determine differences therebetween; judging whether the differences are larger than or equal to predetermined thresholds; and determining that the unit to be measured does not conform to a specification for the unit; otherwise, determining that the unit to be measured conforms to the specification for the unit, in response to the differences being larger than or equal to the predetermined thresholds.

In one example, in the device 500 for estimating physical parameters, the unit to be measured is an optical fiber connector having an end face to be measured, and the physical parameters include a curvature radius and a vertex position of the end face.

Here, it could be appreciated by those skilled in the art that specific functions and operations of the units and modules in the above-described devices 400 and 500 for estimating physical parameters have been described in detail in the methods for estimating physical parameters described above with reference to FIGS. 1 to 7, and thus, repetitive description thereof is omitted.

As described above, the devices 400 and 500 for estimating physical parameters according to the embodiments of the present disclosure can be implemented in various terminal apparatuses, such as computers for controlling interferometric measurements. In one example, the devices 400 and 500 for estimating physical parameters according to the embodiments of the present disclosure may be integrated into the terminal apparatus as software modules and/or hardware modules. For example, the devices 400 and 500 for estimating physical parameters may be software modules in an operating system of the terminal apparatus, or be applications developed for the terminal apparatus. Of course, the devices 400 and 500 for estimating physical parameters may also be ones of many hardware modules of the terminal apparatus.

Alternatively, in another example, the devices 400 and 500 for estimating physical parameters and the terminal apparatus may also be separate apparatuses, and the devices 400 and 500 for estimating physical parameters may be connected to the terminal apparatus through a wired and/or wireless network, and transmit interactive information in accordance with the agreed data format.

Exemplary Electronic Apparatus

Hereinafter, an electronic apparatus according to an embodiment of the present disclosure is described with reference to FIG. 10.

Figure 10:
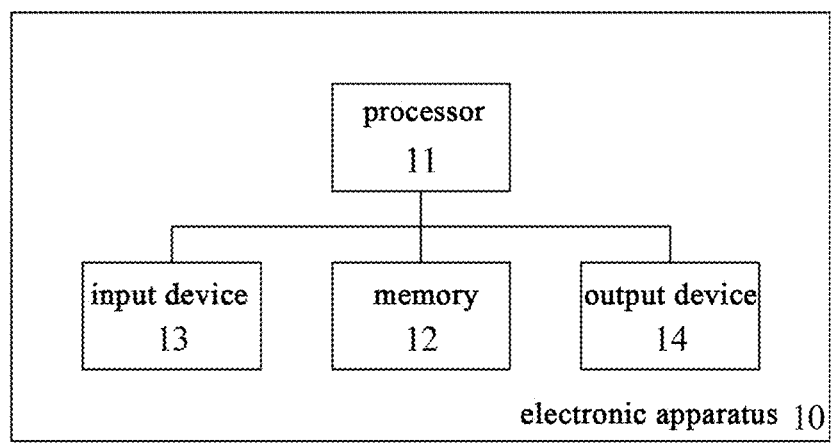
FIG. 10 illustrates a block diagram of an electronic apparatus according to an embodiment of the present disclosure.

FIG. 10 illustrates a block diagram of the electronic apparatus according to the embodiment of the present disclosure.

As shown in FIG. 10, the electronic apparatus 10 includes one or more processors 11 and a memory 12.

The processor 11 may be a central processing unit (CPU) or a processing unit of other form having data processing capability and/or instruction executing capability, and can control other components in the electronic apparatus 10 to execute expected functions.

The memory 12 may include one or more computer program products, and the computer program products may include various forms of computer-readable storage media, for example, a volatile memory and/or a non-volatile memory. For example, the volatile memory may include a random access memory (RAM) and/or a cache memory. For example, the non-volatile memory may include a read-only memory (ROM), a hard disk, a flash memory. One or more computer program instructions may be stored in the computer-readable storage medium, and the processor 11 can execute the computer program instructions to implement the above-mentioned methods for estimating physical parameters of the embodiments of the present disclosure and/or other expected functions. Various contents, such as the number of sampling points, signal intensity, and peak amplitude at each chirp rate, can also be stored in the computer-readable storage medium.

In one example, the electronic apparatus 10 may further include an input device 13 and an output device 14, and these components are interconnected through a bus system and/or other forms of connecting mechanism (not shown).

For example, the input device 13 may include, for example, a keyboard, a mouse.

The output device 14 may output a variety of information to the outside, including coordinates of a center and a curvature radius. The output device 14 may include, for example, a display, a speaker, a printer, a communication network and its connected remote output apparatus.

Of course, for simplicity, only some of the components of the electronic apparatus 10 related to the present disclosure are shown in FIG. 10, and the components such as buses and input/output interfaces are omitted. In addition, depending on the specific application, the electronic apparatus 10 may also include any other suitable components.

Exemplary Computer Program Product and Computer-Readable Storage Medium

In addition to above-described methods and apparatus, the embodiments of the present disclosure may be a computer program product including computer program instructions that, when executed by a processor, cause the processor to execute the steps in the methods for estimating physical parameters according to various embodiments of the present disclosure described in the part of "Exemplary method" in this specification.

The computer program product can be written by any combination of one or more programming languages, to execute program codes of the operations of the embodiments of the present disclosure, and the programming language includes object-oriented programming language such as Java, C++, and further include traditional procedure-type programming language such as "C" language or similar programming language. The program code may be executed fully on the user's computing apparatus, partly on the user's computing apparatus, as a separate software package, partly on the user's computing apparatus and partly on a remote computing apparatus, or fully on the remote computing apparatus or server.

Also, the embodiments of the present disclosure may be a computer readable storage medium storing computer program instructions thereon that, when executed by a processor, cause the processor to execute the steps in the methods for estimating physical parameters according to various embodiments of the present disclosure described in the part of "Exemplary method" in this specification.

The computer-readable storage medium may adopt a readable medium or any combination of more readable media. The readable medium may be a readable signal medium or a readable storage medium. The readable storage medium may include, for example, but not limited to, an electronic, magnetic, optical, electromagnetic, infrared or semiconductor system, apparatus, or device, or any suitable combination thereof. More specific examples (a non-exhaustive list) of the readable storage medium include the following: an electrical connection having one or more wires, a portable disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof.

Basic principal of the present disclosure is described above in combination with specific embodiments, however, it is to be noted that advantages and effects or the like set forth in the present disclosure are only example rather than limitation, these advantages and effects or the like cannot be regarded as necessary for the embodiments of the present disclosure. Further, specific details of above-described disclosure are only for exemplary and for facilitating the understanding rather than limitation, and the present disclosure shall not be limited to being implemented only by adopting the above-described specific details.

Block diagrams of components, devices, apparatus and systems mentioned in the present disclosure are only schematic examples and are not intended to require or imply that connection, arrangement and configuration be implemented according to the manners shown in the block diagrams. Those skilled in the art would understand that these components, devices, apparatus and systems can be connected, arranged or configured in any manner. Words such as "comprise", "include", "have" or the like are inclusive words, which refer to "include but not limited to" and can be interchanged therewith. Words "or" and "and" used here refer to a word "and/or", and can be interchanged therewith, unless otherwise indicated explicitly in context. Word "for example" used here refer to word "for example but not limited to", and can be interchanged therewith.

Further, it needs to point out that, in the device, apparatus and method of the present disclosure, each component or each step can be decomposed and/or re-combined. These decompositions and/or re-combinations should be regarded as equivalent schemes of the present disclosure.

The above description of the disclosed aspects is provided to make those skilled in the art capable of making or using the present disclosure. Various modifications of these aspects are obvious for those skilled in the art, and general principle defined here can be applied to other aspects without departing from range of the present disclosure. Therefore, the present disclosure does not intend to be limited to aspects illustrated here, but covers a widest range in consistent with principle and novel feature disclosed here.

The above description has been already provided in order for exemplification and description. Further, this description does not intend to limit the embodiments of the present disclosure to forms disclosed here. Although a plurality of exemplary aspects and embodiments have been already discussed above, those skilled in the art would appreciate some certain variations, modifications, changes, additions or sub-combinations thereof

What is claimed is:

1. A method for estimating physical parameters based on Newton's rings fringe pattern by using discrete chirp Fourier transform, comprising:
   performing, by using an interferometer, an interferometric measurement on a unit to be measured to obtain a Newton's rings fringe pattern;
   reading, by an image sensor, the Newton's rings fringe pattern to obtain an image of the Newton's rings fringe pattern;
   processing the image of the Newton's rings fringe pattern to obtain the number and length of first-direction signals of the Newton's rings fringe pattern;
   performing, for each of the first-direction signals, a discrete chirp Fourier transform (DCFT) on the first-direction signal based on each first chirp rate parameter within range of the length of first-direction signals, to obtain a first magnitude spectrum of an intensity distribution signal of a first-direction pixel set of each first-direction signal of the Newton's rings fringe pattern under each first chirp rate parameter in a DCFT domain, the first-direction pixel set comprising a line of pixels in a first direction that is one of a row direction and a column direction of the Newton's rings fringe pattern;
   determining a first chirp rate parameter and a first frequency parameter corresponding to a first magnitude peak value based on the first magnitude spectrum; and
   estimating the physical parameters involved in the interferometric measurement at least according to the first chirp rate parameter and first frequency parameter corresponding to the first magnitude peak value.

2. The method for estimating physical parameters of claim 1, further comprising:
   obtaining the number and length of second-direction signals of the Newton's rings fringe pattern;
   performing, for each of the second-direction signals, a DCFT on the second-direction signal based on each second chirp rate parameter within the range of the length of second-direction signals, to obtain a second magnitude spectrum of an intensity distribution signal of a second-direction pixel set of each second-direction signal of the Newton's rings fringe pattern under each second chirp rate parameter in the DCFT domain, the second-direction pixel set comprising a line of pixels in a second direction that is the other of the row direction and the column direction of the Newton's rings fringe pattern;
   determining a second chirp rate parameter and a second frequency parameter corresponding to a second magnitude peak value based on the second magnitude spectrum; and
   estimating the physical parameters involved in the interferometric measurement at least according to the first chirp rate parameter and first frequency parameter corresponding to the first magnitude peak value, and the second chirp rate parameter and second frequency parameter corresponding to the second magnitude peak value.

3. The method for estimating physical parameters of claim 2, wherein the step of estimating the physical parameters involved in the interferometric measurement at least according to the first chirp rate parameter and first frequency parameter corresponding to the first magnitude peak value, and the second chirp rate parameter and second frequency parameter corresponding to the second magnitude peak value comprises:
  multiplying the square of the length of first-direction signals by the square of the spacing of sampling points in the first direction and dividing by the product of the wavelength of incident light corresponding to the Newton's rings fringe pattern and the first chirp rate to calculate a radius of a Newton's rings in the first direction; and
  multiplying the length of first-direction signals by the first frequency parameter and the spacing of sampling points in the first direction and dividing by the negative number of the product of 2 and the first chirp rate to calculate a coordinate of a center of the Newton's rings in the first direction.

4. The method for estimating physical parameters of claim 3, wherein the step of estimating the physical parameters involved in the interferometric measurement at least according to the first chirp rate parameter and first frequency parameter corresponding to the first magnitude peak value, and the second chirp rate parameter and second frequency parameter corresponding to the second magnitude peak value further comprises:
  dividing the sum of radiuses of the Newton's rings in the first direction and the second direction by 2 to calculate a curvature radius of a plano-convex lens that generates the Newton's rings.

5. The method for estimating physical parameters of claim 1, wherein the denominator of the sampling frequency of the discrete chirp Fourier transform is the number of sampling points.

6. The method for estimating physical parameters of claim 1, after the step of reading a Newton's rings fringe pattern obtained by performing an interferometric measurement on a unit to be measured, further comprising:
  removing a background intensity from the Newton's rings fringe pattern.

7. The method for estimating physical parameters of claim 6, after the step of removing a background intensity from the Newton's rings fringe pattern, further comprising:
  converting the intensity distribution signal of the first-direction pixel set in the background-intensity-removed Newton's rings fringe pattern from a real number form into a complex number form.

8. The method for estimating physical parameters of claim 1, after the step of estimating the physical parameters involved in the interferometric measurement at least according to the first chirp rate parameter and first frequency parameter corresponding to the first magnitude peak value, further comprising:
  correcting the physical parameters using an intensity distribution model of the Newton's rings fringe pattern and pixel intensity values in the Newton's rings fringe pattern by taking the estimated physical parameters as initial values for a least square fitting method.

9. The method for estimating physical parameters of claim 1, further comprising:
  comparing the estimated physical parameters with reference physical parameters to determine differences therebetween;
  judging whether the differences are larger than or equal to predetermined thresholds; and
  determining that the unit to be measured does not conform to a specification for the unit, otherwise, determining that the unit to be measured conforms to the specification for the unit, in response to the differences being larger than or equal to the predetermined thresholds.

10. The method for estimating physical parameters of claim 9, wherein the unit to be measured is an optical fiber connector having an end face to be measured, and the physical parameters comprise a curvature radius and a vertex position of the end face.

11. A method for estimating physical parameters, comprising:
  performing, by using an interferometer, an interferometric measurement on a unit to be measured to obtain an interference fringe pattern having a quadratic phase;
  reading, by an image sensor, the interference fringe pattern to obtain an image of the interference fringe pattern;
  processing the image of interference fringe pattern to obtain the number and length of row-direction signals and the number and length of column-direction signals of the interference fringe pattern;
  performing, for each of the row-direction signals, a discrete chirp Fourier transform (DCFT) on the row-direction signal based on each row chirp rate parameter within a range of the length of row-direction signals, to obtain a row magnitude spectrum of an intensity distribution signal of a row-direction pixel set of each row-direction signal of the interference fringe pattern under each row chirp rate parameter in a DCFT domain, the row-direction pixel set comprising a line of pixels in a row direction;
  determining a row chirp rate parameter and a row frequency parameter corresponding to a row magnitude peak value based on the row magnitude spectrum;
  performing, for each of the column-direction signals, a DCFT on the column-direction signal based on each column chirp rate parameter within a range of the length of column-direction signals, to obtain a column magnitude spectrum of an intensity distribution signal of a column-direction pixel set of each column-direction signal of the interference fringe pattern under each column chirp rate parameter in the DCFT domain, the column-direction pixel set comprising a line of pixels in a column direction;
  determining a column chirp rate parameter and a column frequency parameter corresponding to a column magnitude peak value based on the column magnitude spectrum; and
  estimating the physical parameters involved in the interferometric measurement at least according to the row chirp rate parameter, the row frequency parameter, the column chirp rate parameter, and the column frequency parameter.

12. The method for estimating physical parameters of claim 11, before the step of reading an interference fringe pattern obtained by performing an interferometric measurement on a unit to be measured, further comprising:
  receiving the interference fringe pattern having a complex phase higher than the quadratic phase obtained by performing the interferometric measurement on the unit to be measured; and
  piecewise-approximating the interference fringe pattern having the complex phase higher than the quadratic phase into a plurality of interference fringe patterns having the quadratic phase.

13. The method for estimating physical parameters of claim 12, after the step of estimating the physical parameters involved in the interferometric measurement at least according to the row chirp rate parameter, the row frequency parameter, the column chirp rate parameter, and the column frequency parameter, further comprising:
synthesizing the physical parameters estimated with respect to each of the plurality of interference fringe patterns having the quadratic phase to generate a synthesized physical parameter.

14. A method for detecting an end surface of an optical fiber connector, comprising:
obtaining a Newton's rings fringe pattern by performing an interferometric measurement on the end surface of the optical fiber connector by using an interferometer;
reading an image of the Newton's rings fringe pattern by an image sensor;
calculating discrete chirp Fourier transform (DCFT) of the Newton's rings fringe pattern by rows and/or columns;
searching a peak position in the DCFT domain;
estimating a curvature radius and a vertex position of the end surface of the optical fiber connector;
judging whether the end surface of the optical fiber connector conforms to a specification according to the corrected curvature radius and vertex position.

15. The method for detecting an end surface of an optical fiber connector of claim 14, wherein, after reading an image of the Newton's rings fringe pattern by an image sensor, further comprises:
removing a background intensity from the Newton's rings fringe pattern; and
converting the intensity distribution signal of pixels in the Newton's rings fringe pattern from a real number form into a complex number form.

16. The method for detecting an end surface of an optical fiber connector of claim 14, wherein, after estimating a curvature radius and a vertex position of the end surface of the optical fiber connector, further comprises:
conducting a correction using the least square fitting method by taking the estimated values as initial values.

17. The method for detecting an end surface of an optical fiber connector of claim 14, wherein, calculating discrete chirp Fourier transform (DCFT) of the Newton's rings fringe pattern by rows and/or columns comprising:
obtaining the number and length of first-direction signals of the Newton's rings fringe pattern;
performing, for each of the first-direction signals, a DCFT on the first-direction signal based on each first chirp rate parameter within range of the length of first-direction signals, to obtain a first magnitude spectrum of an intensity distribution signal of a first-direction pixel set of each first-direction signal of the Newton's rings fringe pattern under each first chirp rate parameter in a DCFT domain, the first-direction pixel set comprising a line of pixels in a first direction that is one of a row direction and a column direction of the Newton's rings fringe pattern; and
searching a peak position in the DCFT domain comprising:
determining a first chirp rate parameter and a first frequency parameter corresponding to a first magnitude peak value based on the first magnitude spectrum; and
estimating a curvature radius and a vertex position of the end surface of the optical fiber connector comprising:
estimating the curvature radius and the vertex position of the end surface of the optical fiber connector at least according to the first chirp rate parameter and first frequency parameter corresponding to the first magnitude peak value.

18. The method for detecting an end surface of an optical fiber connector of claim 17, wherein, calculating discrete chirp Fourier transform (DCFT) of the Newton's rings fringe pattern by rows and/or columns further comprising:
obtaining the number and length of second-direction signals of the Newton's rings fringe pattern;
performing, for each of the second-direction signals, a DCFT on the second-direction signal based on each second chirp rate parameter within the range of the length of second-direction signals, to obtain a second magnitude spectrum of an intensity distribution signal of a second-direction pixel set of each second-direction signal of the Newton's rings fringe pattern under each second chirp rate parameter in the DCFT domain, the second-direction pixel set comprising a line of pixels in a second direction that is the other of the row direction and the column direction of the Newton's rings fringe pattern; and
searching a peak position in the DCFT domain further comprising:
determining a second chirp rate parameter and a second frequency parameter corresponding to a second magnitude peak value based on the second magnitude spectrum; and
estimating a curvature radius and a vertex position of the end surface of the optical fiber connector further comprising:
estimating the curvature radius and the vertex position of the end surface of the optical fiber connector at least according to the second chirp rate parameter and second frequency parameter corresponding to the second magnitude peak value.

19. The method for detecting an end surface of an optical fiber connector of claim 18, wherein, estimating the curvature radius and the vertex position of the end surface of the optical fiber connector at least according to the first chirp rate parameter and first frequency parameter corresponding to the first magnitude peak value, and the second chirp rate parameter and second frequency parameter corresponding to the second magnitude peak value comprises:
multiplying the square of the length of first-direction signals by the square of the spacing of sampling points in the first direction and dividing by the product of the wavelength of incident light corresponding to the Newton's rings fringe pattern and the first chirp rate to calculate a radius of a Newton's rings in the first direction;
multiplying the square of the length of second-direction signals by the square of the spacing of sampling points in the second direction and dividing by the product of the wavelength of incident light corresponding to the Newton's rings fringe pattern and the second chirp rate to calculate a radius of a Newton's rings in the second direction; and
dividing the sum of radiuses of the Newton's rings in the first direction and the second direction by 2 to calculate the curvature radius of the end surface of the optical fiber connectors.

20. The method for detecting an end surface of an optical fiber connector of claim 18, wherein, estimating the curvature radius and the vertex position of the end surface of the optical fiber connector at least according to the first chirp rate parameter and first frequency parameter corresponding to the first magnitude peak value, and the second chirp rate parameter and second frequency parameter corresponding to the second magnitude peak value comprises:

multiplying the length of first-direction signals by the first frequency parameter and the spacing of sampling points in the first direction and dividing by the negative number of the product of 2 and the first chirp rate to calculate a coordinate of a center of the Newton's rings in the first direction;

multiplying the length of second-direction signals by the second frequency parameter and the spacing of sampling points in the second direction and dividing by the negative number of the product of 2 and the second chirp rate to calculate a coordinate of a center of the Newton's rings in the second direction; and dividing the sum of centers of the Newton's rings in the first direction and the second direction by 2 to calculate the vertex position of the end surface of the optical fiber connectors.

* * * * *